US010190011B2

(12) United States Patent
Ohta

(10) Patent No.: US 10,190,011 B2
(45) Date of Patent: Jan. 29, 2019

(54) INK JET RECORDING METHOD, INK JET INK COMPOSITION, AND INK SET

(71) Applicant: Seiko Epson Corporation, Tokyo (JP)

(72) Inventor: Hitoshi Ohta, Shiojiri (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/488,865

(22) Filed: Apr. 17, 2017

(65) Prior Publication Data

US 2018/0030300 A1 Feb. 1, 2018

(30) Foreign Application Priority Data

Jul. 27, 2016 (JP) ................ 2016-147373

(51) Int. Cl.
| | | |
|---|---|---|
| *B41J 11/00* | (2006.01) | |
| *B41M 7/00* | (2006.01) | |
| *C09D 11/40* | (2014.01) | |
| *C09D 11/36* | (2014.01) | |
| *C09D 11/102* | (2014.01) | |
| *C09D 11/104* | (2014.01) | |
| *C09D 11/107* | (2014.01) | |
| *C09D 11/108* | (2014.01) | |
| *C09D 11/32* | (2014.01) | |
| *C09D 11/106* | (2014.01) | |
| *C09D 11/54* | (2014.01) | |

(52) U.S. Cl.
CPC ............. *C09D 11/40* (2013.01); *B41M 7/009* (2013.01); *C09D 11/102* (2013.01); *C09D 11/104* (2013.01); *C09D 11/106* (2013.01); *C09D 11/107* (2013.01); *C09D 11/108* (2013.01); *C09D 11/32* (2013.01); *C09D 11/36* (2013.01); *C09D 11/54* (2013.01)

(58) Field of Classification Search
CPC ........ B41J 11/0015; B41J 2/01; B41M 7/009; C09D 11/40
See application file for complete search history.

(56) References Cited

U.S. PATENT DOCUMENTS

| 8,911,074 B2 | 12/2014 | Ohta |
| 2014/0132684 A1 | 5/2014 | Ohta |

FOREIGN PATENT DOCUMENTS

| JP | 2013-177526 A | 9/2013 |
| JP | 2014-094495 A | 5/2014 |
| JP | 2015-182349 A | 10/2015 |

*Primary Examiner* — Jason S Uhlenhake
(74) *Attorney, Agent, or Firm* — Harness, Dickey & Pierce, P.L.C.

(57) ABSTRACT

An ink jet recording method includes: forming a first image layer by ejecting a first ink composition that contains resin particles, an organic solvent, and water on a recording medium by an ink jet method; first drying in which 80% by mass or more of water contained in the first ink composition of the first image layer is evaporated; and forming a second image layer by ejecting a second ink composition that contains water, and an organic solvent by which the resin particles contained in the first ink composition dissolve or swell on the first image layer subjected to the first drying by the ink jet method, in which the content of an organic solvent having a normal boiling point of higher than 250° C. in the first ink composition and the second ink composition is 2% by mass or less, respectively.

12 Claims, No Drawings

INK JET RECORDING METHOD, INK JET INK COMPOSITION, AND INK SET

BACKGROUND

1. Technical Field

The present invention relates to an ink jet recording method, an ink jet ink composition, and an ink set.

2. Related Art

In the ink jet recording method, small droplets of ink are ejected from fine nozzles and attached to a recording medium to carry out recording. This method is characterized by being able to record high resolution and high quality images at a high speed with a relatively inexpensive apparatus.

In recent years, research has been carried out into directly recording (printing) labels and the like for products on soft packaging films by the ink jet recording method with respect to soft packaging films such as PET films. In addition, soft packaging films have applications for packaging foods and the like and since high safety is required for such applications, it is desirable to use water-based inks for the printing described above. In the case of using water-based inks, a heat drying process may be performed after the printing.

In addition, the target recording surface of the soft packaging film is formed of, for example, a plastic material such as polyolefin, nylon, or polyester, and transparent or translucent material is often used so that contents can be confirmed. Therefore, when ink jet recording is performed, a predetermined image may be formed using color ink on a layer formed of white ink called an undercoat layer which covers the background (refer to, for example, JP-A-2014-094495). JP-A-2013-177526 proposes a white ink for ink jet recording applicable to such an undercoat layer. Further, JP-A-2015-182349 discloses a recording method for heating a recording medium with a platen.

In the case of recording (overlap printing) by forming an undercoat layer using ink for a lower layer and overlapping ink thereon so as to form an image using ink for an upper layer, if the ink of the upper layer is attached in a state in which there is a large amount of solvent ink of the lower layer, the image may bleed. Therefore, it is conceivable to dry the lower layer and then attach the ink of the upper layer. However, drying of the ink of the lower layer improves bleeding, but durability of the obtained image (especially adhesion between the upper layer and the lower layer) may be insufficient.

It is found that in order to enhance adhesion of overlap printed images, it is important to balance various elements such as a composition of ink forming each layer, or control of the amount of residual volatile components of the lower layer when forming the upper layer.

SUMMARY

An advantage of some aspects of the invention is to provide an ink jet recording method and an ink jet ink composition capable of forming an image obtained by overlap printing a plurality of inks and in which bleeding is suppressed and durability is good.

The invention can be realized in the following aspects or application examples.

According to an aspect of the invention, there is provided an ink jet recording method including: forming a first image layer by ejecting a first ink composition that contains resin particles, an organic solvent, and water on a recording medium by an ink jet method; first drying in which 80% by mass or more of water contained in the first ink composition of the first image layer is evaporated; and forming a second image layer by ejecting a second ink composition that contains water, and an organic solvent by which the resin particles contained in the first ink composition dissolve or swell on the first image layer subjected to the first drying by the ink jet method, in which the content of an organic solvent having a normal boiling point of higher than 250° C. in the first ink composition and the second ink composition is 2% by mass or less, respectively.

In this ink jet recording method, the organic solvent by which the resin particles in the first ink composition dissolve or swell is contained in the second ink composition. Therefore, if the second image layer is formed after evaporating 80% by mass or more of water in the first image layer, the adhesion between the first image layer and the second image layer becomes favorable, and thus it is possible to form an image excellent in durability. In addition, since the second image layer can be formed after evaporating 80% by mass or more of water in the first image layer, it is possible to suppress bleeding. Furthermore, since the content of the organic solvent having a normal boiling point of higher than 250° C. in the first ink composition and the second ink composition is 2% by mass or less, respectively, it is possible that the bleeding of an image is further suppressed and a drying property of an image becomes favorable.

In the ink jet recording method according to the invention, each of the first ink composition and the second ink composition may contain an organic solvent having a normal boiling point of 100° C. or higher and 250° C. or lower.

In this ink jet recording method, it is possible to form an image having the more favorable drying property.

In the ink jet recording method according to the invention, an SP value of an organic solvent by which the resin particles contained in the first ink composition dissolve or swell may be within the range of ±1 (unit: $(cal/cm^3)^{1/2}$) with respect to an SP value of the resin particles contained in the first ink composition.

In this ink jet recording method, the resin particles contained in the first ink composition dissolve or swell more easily by using the organic solvent by which the resin particles contained in the first ink composition dissolve or swell. Therefore, the adhesion (durability of an image) between the first image layer and the second image layer can become more favorable.

In the ink jet recording method according to the invention, the recording medium may be a low ink absorption or a non-ink absorption recording medium.

In this ink jet recording method, even if the recording medium is the low ink absorption or the non-ink absorption recording medium, it is possible to easily form the image having good durability.

In the ink jet recording method according to the invention, each of the first ink composition and the second ink composition may contain a coloring material.

In this ink jet recording method, it is possible to easily obtain a colored image having good durability.

In the ink jet recording method according to the invention, the first ink composition may be a background image ink composition that contains at least one of metal compound particles and metal particles as a coloring material, and the second ink composition may be a colored ink composition that contains a non-white coloring material.

In this ink jet recording method, it is possible to easily obtain a recorded material in which the adhesion between a background image and a colored image is good.

The ink jet recording method according to the invention may further include forming a third image layer by ejecting a clear ink composition that contains resin particles, an organic solvent, and water on the first image layer or the second image layer by the ink jet method after forming the second image layer.

In this ink jet recording method, it is possible to easily form the image having an overcoat layer and to obtain the recorded material good in abrasion resistance.

The ink jet recording method according to the invention may further include second drying in which a volatile component on the recording medium is evaporated after forming each image layer.

In this ink jet recording method, it is possible to easily form the image of which bleeding is suppressed.

In the ink jet recording method according to the invention, in the first drying, the evaporation rate of the organic solvent contained in the first ink composition of the first image layer may be 50% by mass or less.

In this ink jet recording method, it is possible to easily form the image of which bleeding is further suppressed.

According to another aspect of the invention, there is provided an ink jet ink composition including: resin particles; an organic solvent; and water, in which the organic solvent includes an organic solvent A by which the resin particles do not dissolve and swell, and an organic solvent B by which the resin particles dissolve or swell, the total content of the organic solvent A is equal to or more than the total content of the organic solvent B, and the content of an organic solvent having a normal boiling point of higher than 250° C. with respect to the entirety of the ink jet ink composition is 2% by mass or less.

In this ink jet ink composition, since the content of the organic solvent A is equal to or more than the content of the organic solvent B, even if for example, water is evaporated in the vicinity of a nozzle of a recording head, the state that the content of the organic solvent A is more than the content of the organic solvent B is maintained. Due to this, clogging can be suppressed. Furthermore, since the content of the organic solvent having a normal boiling point of higher than 250° C. with respect to the entirety of the ink jet ink composition is 2% by mass or less, the drying property after attaching the ink jet ink composition to the recording medium is good.

In the ink jet ink composition according to the invention, each of the organic solvent A and the organic solvent B may include an organic solvent having a normal boiling point of 100° C. or higher and 250° C. or lower.

In this ink jet ink composition, the clogging of a nozzle is unlikely to occur and the drying property after attaching the ink jet ink composition to the recording medium is good.

In the ink jet ink composition according to the invention, in the organic solvent A, the content of an organic solvent having a normal boiling point of higher than that of an organic solvent of which a normal boiling point is highest in the organic solvent B, may be equal to or less than the content of the organic solvent of which a normal boiling point is highest in the organic solvent B.

In this ink jet ink composition, even if water is evaporated in the vicinity of a nozzle of a recording head, the state that the content of the organic solvent A is more than the content of the organic solvent B can be maintained, and when performing drying after, for example, attaching the ink jet ink composition to the recording medium, the organic solvent B easily remains. Due to this, when being dried on the recording medium, the resin particles further easily dissolve or swell, and the durability of the image can further be good.

According to still another aspect of the invention, there is provided an ink set including: a first ink composition that contains resin particles, an organic solvent, and water, and in which the content of an organic solvent having a normal boiling point of higher than 250° C. is 2% by mass or less; and a second ink composition that contains water, and an organic solvent by which the resin particles contained in the first ink composition dissolve or swell, and in which the content of an organic solvent having a normal boiling point of higher than 250° C. is 2% by mass or less, in which after the first ink composition is attached to a recording medium by an ink jet method and 80% by mass or more of water contained in the first ink composition is evaporated, the second ink composition is attached to the first ink composition on the recording medium by the ink jet method and used.

In this ink set, the second organic solvent by which the resin particles contained in the first ink composition dissolve or swell is contained in the second ink composition, and the content of the organic solvent having a normal boiling point of higher than 250° C. in the first ink composition and the second ink composition is 2% by mass or less, respectively. Therefore, even if after forming the first image layer (undercoat) by the first ink composition and evaporating 80% by mass or more of water in the first image layer, the second image layer is formed thereon by the second ink composition, the adhesion between the undercoat image layer and the image layer is good, and thus it is possible to form the image excellent in the durability. In addition, since it is possible to evaporate 80% by mass or more of water in the first image layer and then form the second image layer, it is possible to sufficiently suppress the bleeding.

DESCRIPTION OF EXEMPLARY EMBODIMENTS

Description will be given below of several embodiments of the invention. The embodiments described below illustrate one example of the invention. The invention is by no means limited to the following embodiments, and includes various types of modifications carried out within a range which does not depart from the gist of the invention. Note that not all of the configurations described below are necessarily indispensable components of the invention.

1. Ink Jet Recording Method

An ink jet recording method according to the present embodiment includes at least a step of forming a first image layer on a recording medium, a first drying step, and a step of forming a second image layer. The step of forming the first image layer according to the present embodiment is performed by ejecting a first ink composition on the recording medium using an ink jet method. Then, the first image layer (image) is formed in a recording region of the recording medium. The recording region of the recording medium is not particularly limited, and is a region which sets out the formation of the second image layer (image) by a second ink composition, and the second ink composition is attached in this region. Below, description will be given of the recording medium and the first ink composition in this order, and the ink jet method will be described in another section.

1.1. Recording Medium

The recording medium on which an image is formed by the ink jet recording method according to the present embodiment may have a recording surface which absorbs ink or may not have a recording surface which absorbs ink. Accordingly, the recording medium is not particularly limited and examples thereof include an ink-absorbing recording medium such as paper, film, or cloth, a low ink absorption recording medium such as printing paper, a non-ink absorption recording medium such as metal, glass, polymer, and the like. However, the excellent effect of the ink jet recording method of the present embodiment is more remarkable in a case of recording an image on a low ink absorption or a non-ink absorption recording medium.

The low ink absorption or non-absorption recording medium refers to a recording medium having a property of not absorbing the ink composition at all or hardly absorbing the ink composition. Quantitatively, the non-ink absorption or the low absorption recording medium indicates a "recording medium having a water absorption amount of 10 mL/m$^2$ or less from the start of contact to 30 msec$^{1/2}$ in the Bristow method". The Bristow method is the most popular method for measuring the amount of liquid absorption in a short time and is also adopted by Japan Technical Association of the Pulp and Paper Industry (JAPAN TAPPI). The details of the test method are laid out in the standard No. 51 "JAPAN TAPPI Paper Pulp Test Method 2000 Edition" under "Paper and paperboard—Liquid absorbency test method—Bristow method". On the other hand, an ink absorption recording medium refers to a recording medium which is not a non-ink absorption or low ink absorption recording medium.

Examples of the non-ink absorption recording medium include a plastic film which does not have an ink absorbing layer, a medium in which plastic is coated on a base material such as paper, a medium with a plastic film bonded thereto, and the like. Examples of plastics here include polyvinyl chloride, polyethylene terephthalate, polycarbonate, polystyrene, polyurethane, polyethylene, polypropylene, and the like.

In addition, examples of the low ink absorption recording medium include a recording medium provided with a coating layer for receiving ink on the surface thereof, examples of a recording medium in which the base material is paper include printing paper such as art paper, coated paper, and matte paper, in a case where the base material is a plastic film, examples thereof include films where a hydrophilic polymer is coated on a surface of polyvinyl chloride, polyethylene terephthalate, polycarbonate, polystyrene, polyurethane, polyethylene, polypropylene, or the like, and films where particles such as silica or titanium are coated with a binder.

It is possible to favorably use the ink jet recording method according to the present embodiment for a soft packaging film. The soft packaging film is an aspect of the non-ink absorption recording medium described above. More specifically, the soft packaging film is a highly flexible film material used for food packaging, toiletries, cosmetic packaging and the like, and is a film material in which materials having anti-fogging properties or antistatic properties, antioxidants, or the like are present on the film surface, and which has a thickness in the range of 5 to 70 μm (preferably 10 to 50 μm). In a case where an ink composition is recorded on this film, it is difficult to fix the ink compared to a plastic film with a normal thickness, and even if the ink is fixed, peeling is liable to occur because the ink is not able to cope with the flexibility of the film. The ink jet recording method according to the present embodiment is more suitable for a soft packaging film.

In the materials forming the recording surface of the soft packaging film, it is possible to use materials which include at least one type of resin selected from olefin-based resins (polyethylene, polypropylene, and the like), ester-based resins (polyester, and the like), vinyl chloride-based resins (polyvinyl chloride, and the like), amide-based resins (polyamide, and the like). As the film base material including the recording surface of the soft packaging film, it is possible to use materials in which these resins are processed into films or sheets. In the case of a film or sheet using a resin, it is possible to use any of an unstretched film, a stretched film stretched in a uniaxial direction or a biaxial direction, or the like, and films stretched in a biaxial direction are preferably used. In addition, it is also possible to use a film or sheet formed of each type of resin in an laminated state as necessary.

Here, the recording medium may be colorless and transparent, translucent, colored and transparent, chromatic and opaque, achromatic and opaque, and the like. In addition, the recording medium itself may be colored or may be translucent or transparent. In such a case, by setting the first ink composition as the background image ink composition, it is possible for the first image layer to function as a covering layer for covering the color of the recording medium itself. For example, when a color image is recorded as the second image layer using the second ink composition, if a background image was previously recorded in the region for recording a color image with the background image ink composition, it may be possible to improve the color development of the color image.

1.2. Step of Forming First Image Layer

The step of forming the first image layer is performed by ejecting the first ink composition that contains resin particles, an organic solvent, and water on the recording medium using the ink jet method. The first image layer is formed of the first ink composition, and may function as a background image in a case where the first ink composition contains a coloring material.

The first ink composition contains at least resin particles, an organic solvent, and water. In a case where the first ink composition is set as a background image ink composition, it is possible to set the first ink composition as for example, a white ink composition or a glittering ink composition.

The white ink composition is an ink capable of recording a color called "white" as commonly understood by society, including whites which are slightly colored. In addition, the ink containing the pigment includes inks named and sold under the name "white ink" or the like. Further, for example, in a case where the ink is recorded on Epson genuine photographic paper <glossy> (manufactured by Seiko Epson Corp.) in an amount of 100% duty or more or sufficient for covering the surface of the photographic paper, in a case where the lightness (L*) and the chromaticity (a*, b*) of the ink are measured using a spectrophotometer Spectrolino (trade name, manufactured by Gretag-Macbeth) by setting the measurement conditions as D50 light source, an observation field of view of 2°, a concentration of DIN NB, a white standard of Abs, a filter as No, and a measurement mode as Reflectance, inks exhibiting ranges of 70≤L*≤100, −4.5≤a*≤2, −6≤b*≤2.5 are included in the white ink composition.

The glittering ink composition refers to a composition which glitters when attached to a recording medium. In addition, the glittering property indicates a property which, for example, imparts a characteristic according to the specular glossiness of an image to be obtained (refer to Japanese Industrial Standard (JIS) Z 8741). For example, as types of glittering property, there are a glittering property which specularly reflects light, a so-called matte style glittering property, and the like, and it is possible to impart characteristics according to, for example, the high and low specular glossiness.

1.2.1. Resin Particles

The first ink composition contains resin particles. In the present specification, resin particles contained in the first ink composition are referred to as first resin particles. That is, in the present specification, the term "the first resin particles" means "the resin particles contained in the first ink composition". The first resin particles have a function of improving the adhesion and abrasion resistance of an image to be formed. The first ink composition contains resin particles that dissolve or swell by a second organic solvent described below among various resin particles described below. Further, the first ink composition may contain resin particles that do not dissolve and swell by the second organic solvent described below. Such resin particles can be selected from examples described below.

Hereinafter, resin particles that can be used as the first resin particles will be described.

The glass transition temperature (Tg) of the resin particles is not particularly limited, but the upper limit thereof is preferably 150° C. or less. When the Tg of the resin particles is 25° C. or more, it is possible to obtain favorable abrasion resistance while sufficiently securing the adhesion of the image to the recording medium. In addition, by setting the Tg of the resin particles is 150° C. or less, it is possible to suppress the occurrence of cracks or the like when the first image layer is dried and to promote the film formation of the resin, thus it is possible to obtain an image with favorable adhesion and abrasion resistance.

Examples of usable resins forming the resin particles include an acrylic-based resin, a styrene-acrylic-based resin, a fluorene-based resin, a urethane-based resin, an olefin-based resin, a rosin modified resin, a terpene-based resin, an ester-based resin, an amide-based resin, an epoxy-based resin, a vinyl chloride-based resin, a vinyl chloride-vinyl acetate copolymer, an ethylene vinyl acetate-based resin, and the like. It is possible to use these resins as one type or in a combination of two or more types. Among these resins, from the viewpoint that it is possible to further improve the adhesion of the first image layer to the recording medium, the material of the resin particles included in the first ink composition is more preferably at least one type selected from a urethane-based resin, an ester-based resin, an acrylic-based resin, and a styrene-acrylic-based resin.

The urethane-based resin is a polymer synthesized by reacting a polyisocyanate with a polyol. It is possible to perform the synthesis of the urethane-based resin using a known method.

Examples of the polyisocyanate include chain aliphatic isocyanates such as tetramethylene diisocyanate, 1,6-hexamethylene diisocyanate, dodecamethylene diisocyanate, trimethylhexamethylene diisocyanate, and lysine diisocyanate, aliphatic isocyanates having a cyclic structure such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, and 3,3'-dimethyl-4,4'-dicyclohexylmethane diisocyanate, and aromatic isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, and tetramethylxylylene diisocyanate. During synthesis of the urethane resin, the polyisocyanates described above may be used alone, or two or more types thereof may be used in combination.

Examples of the polyols include polyether polyol, polycarbonate polyol, and the like. Examples of the polyether polyols include polyethylene glycol, polypropylene glycol, polytetramethylene glycol, and the like. Examples of the polycarbonate polyols include diols such as 1,3-propanediol, 1,4-butanediol, 1,6-hexanediol, diethylene glycol, polyethylene glycol, polypropylene glycol, polytetramethylene glycol, and the like, dialkyl carbonates such as phosgene and dimethyl carbonate, and reaction products with cyclic carbonates such as ethylene carbonate.

As the urethane resin, an emulsion type resin is preferably used. Commercial products can be used as resin emulsions which include urethane-based resins and examples thereof include Superflex 740 (trade name, manufactured by Dai-ichi Kogyo Seiyaku Co., Ltd.), Bondic 1940NE (trade name, manufactured by DIC Corp.), Takelac W-6061 (trade name, manufactured by Mitsui Chemicals, Inc.), and the like.

The ester-based resin is more preferably an emulsion type. Commercial products may be used as the resin emulsions which include ester-based resins and examples thereof include Ellether KA-5034, KA-5071S, KZA-1734, KZA-6034, KZA-3556 (all trade names, manufactured by Unitika Ltd.), and the like.

Furthermore, from the viewpoints of the ejecting property, adhesion to a recording medium, and image storability at high temperature, the ester-based resin as the resin particles used in the first ink composition is more preferably a graft polymer formed of a main chain segment (A1) formed of a polyester resin (referred to below as "polyester resin segment (A1)" or "segment (A1)") and a side chain segment (A2) formed of an addition polymerization resin (referred to below as an "addition polymerization resin segment (A2)" or "segment (A2)"). It is possible to carry out the synthesis of the ester-based resin with a known method, for example, as follows.

The main chain segment (A1) being formed of a polyester resin means that the main chain segment (A1) is derived from a polyester resin. In addition, the side chain segment (A2) being formed of an addition polymerization resin means that the side chain segment (A2) is derived from an addition polymerization resin. Furthermore, the graft polymer may have other segments in addition to the segment (A1) and the segment (A2). However, the content of the segment (A1) and the segment (A2) in the graft polymer is preferably 90% by mass or more, more preferably 95% by mass or more, and even more preferably substantially 100% by mass.

From the viewpoints of the ejecting property of the ink, adhesion to a recording medium, and image storability at high temperature, the mass ratio [segment (A1)/segment (A2)] of the segment (A1) to the segment (A2) forming the graft polymer is preferably 50/50 or more, more preferably 55/45 or more, and even more preferably 65/35 or more, and in addition, from the viewpoint of the fixability after drying the ink, preferably 95/5 or less, and more preferably 85/15 or less. In addition, the mass ratio is preferably 50/50 to 95/5, more preferably 55/45 to 95/5, even more preferably 65/35 to 85/15, and still more preferably 65/35 to 75/25.

The polyester resin segment (A1) forming the graft polymer is a resin segment obtained by condensation polymerization of an alcohol component and a carboxylic acid component. The alcohol component which is the raw material monomer of the segment (A1) preferably includes an alkylene oxide adduct of bisphenol A.

The alkylene oxide adduct of bisphenol A means the whole structure obtained by adding an oxyalkylene group to 2,2-bis (4-hydroxyphenyl) propane. The alkylene oxide adducts of bisphenol A may be used alone or in a combination of two or more types. The alkylene oxide adduct of bisphenol A is preferably a propylene oxide adduct of bisphenol A and an ethylene oxide adduct of bisphenol A, more preferably a propylene oxide adduct of bisphenol A, and it is even more preferable to use the above in combination.

The content of the alkylene oxide adduct of bisphenol A in the alcohol component which is the raw material monomer of the segment (A1) is preferably 50 mol % or more, more preferably 60 mol % or more, and even more preferably 70 mol % or more. In addition, the content of the alkylene oxide adduct of bisphenol A is preferably 90 mol % or less, more preferably 85 mol % or less, and even more preferably 80 mol % or less.

It is possible for the alcohol component which is the raw material monomer of the segment (A1) to contain the following alcohol components in addition to the alkylene oxide adduct of bisphenol A.

Specifically, examples of the alcohol component of the raw material monomer (also referred to below as "raw material monomer of the segment (A1)") from which the configuration unit of the segment (A1) is derived include ethylene glycol, propylene glycol (1,2 propanediol), glycerin, pentaerythritol, trimethylolpropane, hydrogenated bisphenol A, sorbitol, an alkylene (2 to 4 carbon atoms) oxide adduct thereof (average addition mole number 1 to 16), and the like. These alcohol components may be used alone or in a combination of two or more types. Among these, from the viewpoint of initial fixability, one type or two types of 1,2-propanediol and hydrogenated bisphenol A are preferable, from the viewpoint of ejecting property, 1,2-propanediol is more preferable, and from the viewpoint of image storability at high temperature, hydrogenated bisphenol A is more preferable. Among the above alcohol components, from the viewpoint of fixability, it is preferable to use an alkylene oxide adduct of bisphenol A in combination with hydrogenated bisphenol A, and it is more preferable to use a propylene oxide adduct of bisphenol A in combination with hydrogenated bisphenol A, and it is even more preferable to use a propylene oxide adduct of bisphenol A and an ethylene oxide adduct of bisphenol A in combination with hydrogenated bisphenol A.

The segment (A1) is a polyester resin, and a carboxylic acid component is used as a raw material monomer in addition to the alcohol component. Examples of the carboxylic acid component which is the raw material monomer of the segment (A1) include aromatic dicarboxylic acids such as phthalic acid, isophthalic acid, and terephthalic acid; aliphatic dicarboxylic acids such as adipic acid, succinic acid, succinic acid having an alkyl group and/or an alkenyl group, and allyl alcohol; alicyclic dicarboxylic acids such as cyclohexanedicarboxylic acids and decalin dicarboxylic acids; trivalent or higher polyvalent carboxylic acids such as trimellitic acid and pyromellitic acid, anhydrides of these acids and alkyls (1 to 3 carbon atoms) esters thereof, and the like.

From the viewpoints of improving the ejecting property of the ink, fixability to a recording medium, and image storability at high temperature, aromatic dicarboxylic acid and alicyclic dicarboxylic acid are preferable, and cyclohexane dicarboxylic acid and isophthalic acid are more preferable. Among these, from the viewpoint of image storability at high temperatures of the ink and fixability after drying, aromatic dicarboxylic acid is preferable, and isophthalic acid is more preferable. The carboxylic acid component may be included singly or in a combination of two or more types.

In addition, the carboxylic acid component preferably includes a carboxylic acid having a non-aromatic carbon-carbon unsaturated bond, for example, an unsaturated aliphatic carboxylic acid and/or an unsaturated alicyclic carboxylic acid. It is possible for the portion of the carbon-carbon unsaturated bond to be a binding moiety with the segment (A2) in the graft polymer, and in such a case, the unsaturated bond becomes a saturated bond.

Examples of the carboxylic acid (unsaturated aliphatic carboxylic acid or unsaturated alicyclic carboxylic acid) having a non-aromatic carbon-carbon unsaturated bond include unsaturated aliphatic carboxylic acids such as fumaric acid, maleic acid, acrylic acid, and methacrylic acid, unsaturated alicyclic carboxylic acids such as tetrahydrophthalic acid, and the like. From the viewpoint of reactivity, fumaric acid, maleic acid, and tetrahydrophthalic acid are preferable, and fumaric acid is more preferable.

From the viewpoint of fixability after drying of the ink, the content of the carboxylic acid having a non-aromatic carbon-carbon unsaturated bond in the carboxylic acid component is preferably 5 mol % or more, more preferably 7 mol % or more, even more preferably 8 mol % or more, and still more preferably 12 mol % or more, from the viewpoint of the initial fixability of the ink, preferably 30 mol % or less, more preferably 25 mol % or less, and even more preferably 20 mol % or less, and still more preferably 18 mol % or less, and from the viewpoint of developing the effect of improving ejectability and image storability at high temperatures due to the segment (A2) by sufficiently grafting the segment (A2) while maintaining the effect of improving the fixability due to the segment (A1) is preferably 5 to 30 mol %, more preferably 7 to 25 mol %, even more preferably 8 to 20 mol %, and still more preferably 12 to 18 mol %.

From the viewpoint of improving image storability at high temperature of the ink and fixability after drying, the content of the aromatic dicarboxylic acid in the carboxylic acid component is preferably 50 mol % or more, more preferably 70 mol % or more, even more preferably 80 mol % or more, and still more preferably 82 mol % or more, and in addition, preferably 95 mol % or less, more preferably 92 mol % or less, and even more preferably 88 mol % or less.

From the viewpoint of adjusting the particle diameter of the resin particles and improving the adhesion and image storability at high temperature in the segment (A1), the molar ratio (hydroxyl group/carboxy group) of the hydroxyl group of the alcohol component to the carboxy group of the carboxylic acid component is preferably 100/90 to 100/120, more preferably 100/95 to 100/110, and even more preferably 100/100 to 100/105.

The segment (A2) forming the graft polymer is a segment formed of an addition polymerization resin formed of configuration units derived from the addition polymerizable monomer (a2) (also referred to below as "monomer (a2)"). The segment (A2) is a side chain in the graft polymer. Examples of the addition polymerizable monomer (a2) include one type or two or more types of styrenes such as styrene, methylstyrene, α-methylstyrene, β-methylstyrene, t-butylstyrene, chlorostyrene, chloromethylstyrene, methoxystyrene, styrenesulfonic acid or salts thereof; (meth)acrylic acid esters such as (meth) alkyl acrylates (1 to 18 carbon atoms), benzyl (meth)acrylate and dimethylaminoethyl (meth)acrylate; olefins such as ethylene, propylene, and butadiene; vinyl halides such as vinyl chloride; vinyl esters such as vinyl acetate and vinyl propionate; vinyl ethers such as vinyl methyl ether; vinylidene halides such as vinylidene chloride; and N-vinyl compounds such as N-vinyl pyrrolidone.

Among these, from the viewpoint of improving fixability to a recording medium and image storability at high temperature, one type or two types of styrenes and (meth)acrylic acid esters are preferable, and two types are more preferable.

The addition-polymerizable monomer having an aromatic group is preferably one type or two or more types of styrene, methylstyrene, phenoxyethylene glycol (meth)acrylate, benzyl methacrylate, and benzyl acrylate. Among these, one type or two types of styrene and phenoxyethylene glycol (meth)acrylate are preferable, and from the viewpoint of the raw material cost of the monomer, it is more preferable to include styrene, and styrene is even more preferable.

The (meth)acrylic acid ester preferably has an alkyl group having 1 to 22 carbon atoms, preferably 6 to 18 carbon atoms, and examples thereof include methyl (meth)acrylate, ethyl (meth)acrylate, (iso) propyl (meth)acrylate, (iso or tertiary) butyl (meth)acrylate, (iso) amyl (meth)acrylate, cyclohexyl (meth)acrylate, 2-ethylhexyl (meth)acrylate, (iso) octyl (meth)acrylate, (iso) decyl (meth)acrylate, (iso) dodecyl (meth)acrylate, (iso) stearyl (meth)acrylate, lauryl acrylate and the like, preferably one type or two types of 2-ethylhexyl (meth)acrylate and lauryl acrylate.

The addition polymerizable monomer (a2) is preferably a combination of at least one type of the above (meth)acrylic acid esters and styrene, and more preferably a combination of one type or two types of 2-ethylhexyl (meth)acrylate and lauryl acrylate and styrene.

From the viewpoints of the ejecting property, fixability to a recording medium, and image storability at high temperature, the content of the configuration unit derived from the addition polymerizable monomer having an aromatic group in the segment (A2) is preferably 40% by mass or more, more preferably 45% by mass or more, more preferably 50% by mass or more, more preferably 51% by mass or more, and preferably 100% by mass or less, more preferably 90% by mass or less, even more preferably 85% by mass or less, and still more preferably 80% by mass or less.

In addition, the configuration unit derived from the (meth)acrylic acid ester is preferably used in combination with styrene from the viewpoints of initial fixability and fixability after drying, and the content of the configuration unit derived from the (meth)acrylic acid ester in the segment (A2) is preferably 10% by mass or more, more preferably 15% by mass or more, and even more preferably 35% by mass or more, from the viewpoint of the ejection property, fixability to a recording medium and image storability at high temperature and preferably 60% by mass or less, more preferably 55% by mass or less, and even more preferably 50% by mass or less.

From the viewpoints of the initial fixability and the fixability after drying, the mass ratio [the total of the components having the unsaturated groups of segment (A2)/segment (A1)] of the total amount of unsaturated aliphatic carboxylic acid and unsaturated alicyclic carboxylic acid among the raw material monomers of segment (A2) and segment (A1) is preferably 1/1 to 40/1, more preferably 5/1 to 30/1, and even more preferably 10/1 to 15/1.

The acrylic resin refers to a polymer obtained by using at least one type of (meth)acrylic acid, (meth)acrylic acid ester, acrylonitrile, cyanoacrylate, and acrylamide as a monomer (also referred to below as "acrylic monomer"). The acrylic-based resin may be a homopolymer of an acrylic monomer or a copolymer with a monomer other than an acrylic monomer (for example, olefin, styrene, vinyl acetate, vinyl chloride, vinyl alcohol, vinyl ether, vinyl pyrrolidone, vinyl pyridine, vinyl carbazole, vinyl imidazole, vinylidene chloride, and the like). Note that, the copolymer described above may take any form of a random copolymer, a block copolymer, an alternating copolymer, and a graft copolymer. In the present specification, "(meth)acrylic" means at least one of acrylic and the corresponding methacrylic. It is possible to perform the synthesis of the acrylic-based resin using a known method.

Among those described above, from the viewpoint that it is possible to further improve the adhesion of the first image layer, as the acrylic-based resin, at least one of a (meth)acrylic resin and a styrene-(meth)acrylic acid copolymer resin is preferable, at least one of an acrylic resin and a styrene-acrylic acid copolymer-based resin is more preferable, and a styrene-acrylic acid copolymer-based resin is even more preferable. In addition, the acrylic resin is more preferably supplied as an emulsion type.

Commercial products may be used as the resin emulsion containing the acrylic resin and examples thereof include Mowinyl 972, 7180 (all trade names, manufactured by Nippon Synthetic Chemical Industry Co., Ltd.), Joncryl 530, 538, 1908, 1925, 1992 (all trade names, manufactured by BASF SE), and the like.

The first ink composition contains at least one type of resin particles that dissolve or swell by an organic solvent contained in the second ink composition described below among the resin particles exemplified above. Such a type of resin particles depends on the organic solvent contained in the second ink composition. In addition, the first ink composition may contain a plurality of types of resin particles. That is, in addition to resin particles that dissolve or swell by the organic solvent contained in the second ink composition described below, the first ink composition may contain the other resin particles (resin particles that do not dissolve or swell by the organic solvent contained in the second ink composition). The other resin particles can be selected from the resin particles exemplified above, and the types thereof depend the organic solvent contained in the second ink composition.

The content (solid content) of the resin particles (the first resin particles) in the first ink composition with respect to the total mass of the first ink composition in a case where a plurality of types are used is preferably 0.5% by mass or more and 15% by mass or less, and more preferably 1% by mass or more and 10% by mass or less. Setting the content of the first resin particles to 0.5% by mass or more improves the adhesion of the first image layer to the recording medium and the adhesion to the second image layer. In addition, by setting the content of the first resin particles to 15% by mass or less, there is a tendency for the ejection property of the first ink composition from the recording head to be favorable. Further, the content of the resin particles (resin particles including the first resin particles) contained in the first ink composition with respect to the total mass of the first ink composition is preferably 0.5% by mass or more and 20% by mass or less, and more preferably 1% by mass or more and 15% by mass or less.

1.2.2. Organic Solvent

The first ink composition contains an organic solvent. In the present specification, an organic solvent contained in the first ink composition is referred to as a first organic solvent. That is, in the present specification, the term "the first organic solvent" means "the organic solvent contained in the first ink composition". Examples of the organic solvent include a water-soluble organic solvent. The water-soluble organic solvent is not particularly limited, and examples thereof include alkyl polyols, pyrrolidone derivatives, glycol ethers, and the like. These water-soluble organic solvents may be used alone or in a combination of two or more types. Note that, in the present specification, "water-soluble" means being provided with a property where the solubility in 100 g of water at 20° C. is 0.1 g or more. Hereinafter, the organic solvent will be simply referred in some cases as the concept including the water-soluble organic solvent.

Examples of the alkyl polyols include propylene glycol, dipropylene glycol, 1,2-butanediol, 1,2-pentanediol, 1,2-hexanediol, 1,2-heptanediol, 1,3-butylene glycol, 3-methyl-1,3-propanediol, 2-ethyl-2-methyl-1,3-propanediol, 2-methyl-1,3-propanediol, 2-methyl-2-propyl-1,3-propanediol, 2,2-dimethyl-1,3-propanediol, 2-methylpentane-2,4-diol, 3-methyl-1,5-pentanediol, and the like. Alkyl polyols have a function of enhancing the wettability of the ink with respect to the recording medium and suppressing the solidification and drying of the ink. In a case of containing alkyl polyols, it is possible to set the content thereof to 1% by mass or more and 50% by mass or less with respect to the total mass of the first ink composition.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. It is possible for the pyrrolidone derivative to act as a favorable dissolving agent for the resin component. In the case of containing a pyrrolidone derivative, it is possible to set the content thereof to 0.5% by mass or more and 30% by mass or less with respect to the total mass of the first ink composition.

Examples of glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, and the like. It is possible to use these singly or as a mixture of two or more types. It is possible for glycol ethers to control the wettability and penetration rate of the ink with respect to the recording medium. In the case of containing glycol ethers, it is possible to set the content thereof to 0.05% by mass or more and 6% by mass or less with respect to the total mass of the first ink composition.

It is possible to set the total content of the first organic solvent to be 1% by mass or more and 50% by mass or less, preferably 2% by mass or more and 45% by mass or less, more preferably 3% by mass or more and 40% by mass or less, and even more preferably 10% by mass or more and 35% by mass or less with respect to the total mass of the first ink composition.

Note that, in the first ink composition, the content of the organic solvent having a normal boiling point of higher than 250° C. is 2% by mass or less. In this case, the ink may or may not contain the organic solvent having a normal boiling point of higher than 250° C., and in a case where the organic solvent is contained, the content is as described above or less. By setting the content of the organic solvent having a normal boiling point of higher than 250° C. to be within the range described above, it is possible to prevent the drying property of the ink from being significantly lowered. As a result, it is possible to prevent the fixability of an image from deteriorating when for example, performing recording on a soft packaging film. In addition, even if the temperature of the recording medium in the drying step is made to be relatively low, it is possible to sufficiently carry out the drying. Examples of the organic solvent having a normal boiling point of higher than 250° C. include glycerin (normal boiling point of 290° C.)

In addition, the organic solvent contained in the first ink composition may be used alone or in a combination of two or more types, and among these, it is preferable to contain an organic solvent having a normal boiling point of 80° C. or more and 250° C. or less, preferably 100° C. or more and 250° C. or less, and more preferably 120° C. or more and 240° C. or less. In addition, among the organic solvents contained in the ink, the content of the organic solvent having a normal boiling point of higher than 250° C. is preferably 1.5% by mass or less, more preferably 1% by mass or less, and even more preferably 0.5% by mass or less. In this case, it is possible to keep the drying property of the ink high.

1.2.3. Water

The first ink composition contains water. Water is the main medium of the first ink composition and is a component which is evaporated and dispersed by drying. It is preferable that the water be pure water or ultrapure water such as ion exchanged water, ultra-filtered water, reverse osmosis water, or distilled water in which ionic impurities are removed as much as possible. In addition, it is preferable to use water sterilized by ultraviolet irradiation or addition of hydrogen peroxide or the like since it is possible to suppress the generation of mold and bacteria in a case where ink is stored for a long period.

The first ink composition is preferably a so-called water-based ink which includes water as the main solvent (containing 40% by mass or more of water). The water-based ink has advantages in that the odor is suppressed and the ink is good for the environment since 40% by mass or more of the composition is water. Therefore, it is preferable that 50% by mass or more of water be contained.

1.2.4. Other Components

The first ink composition of the present embodiment can contain a coloring material, a wax, a resin dispersant, a surfactant, and the like.

Coloring Material

Examples of the coloring material include a white coloring material, a glittering pigment, and the like, and a non-white coloring material described below.

Examples of the white coloring material include metal compounds such as metal oxides, barium sulfate, and calcium carbonate. Examples of the metal compounds include titanium dioxide, zinc oxide, silica, alumina, magnesium oxide, and the like. In addition, the white coloring material includes particles having a hollow structure. The particles having a hollow structure are not particularly limited, and it is possible to use well-known particles. As the particles having a hollow structure, it is possible to preferably use the particles described in the specification of U.S. Pat. No. 4,880,465 and the like. From the viewpoint of good whiteness and abrasion resistance, it is preferable to use titanium dioxide as the white coloring material from among these.

In a case where a white coloring material is used, the content (solid content) of the white coloring material is 0.5% by mass or more and 20% by mass or less, preferably 1% by mass or more and 20% by mass or less, more preferably 5% by mass or more and 15% by mass or less, and even more preferably 7% by mass or more and 15% by mass or less with respect to the total mass of the first ink composition. When the content of the white coloring material is within the range described above, nozzle clogging or the like of the ink jet recording apparatus is not easily generated and it is possible to sufficiently satisfy the color concentration such as whiteness.

In addition, the volume-based average particle diameter of the white coloring material (referred to below as the "average particle diameter") is preferably 30 nm or more and 600 nm or less, and more preferably 200 nm or more and 400 nm or less. When the average particle diameter of the white coloring material is in the above range, the particles do not easily settle and it is possible to improve the dispersion stability, additionally, it is possible to make it difficult for nozzle clogging or the like to occur when applied to an ink jet recording apparatus. In addition, if the average particle diameter of the white coloring material is within the above range, it is possible to sufficiently satisfy the color concentration such as whiteness.

It is possible to measure the average particle diameter of the white coloring material with a particle size distribution measuring apparatus using the laser diffraction scattering method as the measurement principle. Examples of the particle size distribution measuring apparatus include a particle size distribution meter (for example, "Microtrac UPA" manufactured by Nikkiso Co., Ltd.) using the dynamic light scattering method as the measurement principle.

The glittering pigment is not particularly limited as long as it able to exhibit a glittering property when attached to a medium, and examples thereof include metal particles of alloys of one type or two or more types (also referred to as metallic pigments) selected from the group formed of aluminum, silver, gold, platinum, nickel, chromium, tin, zinc, indium, titanium, and copper, and pearl pigments having pearly luster. Representative examples of the pearl pigment include pigments having pearly luster and interference gloss such as titanium dioxide-coated mica, fish scale foil, and bismuth oxychloride. In addition, the glittering pigment may be subjected to a surface treatment for suppressing reaction with water. It is possible to form an image having excellent brightness by adding a glittering pigment into the ink.

In a case of using a glittering pigment, the content of the glittering pigment is preferably 0.5% by mass or more and 30% by mass or less, and more preferably 1% by mass or more and 15% by mass or less with respect to the total mass of the first ink composition. When the content of the glittering pigment is within the range described above, it is possible to improve the ejection stability from the nozzle of the ink jet recording apparatus and the storage stability of the glittering ink composition.

Wax

The first ink composition may contain wax. Since the wax is provided with a function of imparting lubrication to the first image layer, it is possible to reduce peeling of the first image layer and the like.

Examples of the components forming the wax include plant-animal waxes such as carnauba wax, candeli wax, beeswax, rice wax, and lanolin; petroleum type waxes such as paraffin wax, microcrystalline wax, polyethylene wax, oxidized polyethylene wax, and petrolatum wax; mineral waxes such as montan wax and ozokerite; synthetic waxes such as carbon wax, Hoechst wax, polyolefin wax, and stearic acid amide; natural and synthetic wax emulsions or mixed waxes such as α-olefin/maleic anhydride copolymer; and the like and it is possible to use these singly or as a mix of a plurality of types. Among these, from the viewpoint of being superior due to the effect of enhancing fixability to the soft packaging film described below, polyolefin waxes (particularly, polyethylene wax, polypropylene wax) and paraffin wax are preferably used.

Commercially available products can be used as waxes as they are and examples thereof include Nopcoat PEM-17 (trade name, manufactured by San Nopco Ltd.), Chemipearl W4005 (trade name, manufactured by Mitsui Chemicals, Inc.), AQUACER 515, 539, 593 (all trade names, manufactured by BYK Japan K.K.), and the like.

From the viewpoint of suppressing deterioration of the properties of the wax by excessively melting the wax in the drying step, it is preferable to use a wax where the melting point is 50° C. or more and 200° C. or less, more preferably a wax where the melting point is 70° C. or more and 180° C. or less, and even more preferably a wax where the melting point is 100° C. or more and 180° C. or less.

The wax may be supplied in the form of an emulsion or a suspension, and in such a case it is possible to regard the wax as one type of resin particles. The content of the wax is preferably 0.1% by mass or more and 10% by mass or less, more preferably 0.5% by mass or more and 5% by mass or less, and even more preferably 1% by mass or more and 4% by mass or less in terms of solid content with respect to the total mass of the first ink composition. When the content of the wax is within the range described above, it is possible to favorably exhibit the function of the wax described above.

Resin Dispersant

In a case where the first ink composition contains a white coloring material and a non-white coloring material as a coloring material, and a glittering pigment as a pigment as a coloring material, it is preferable that these material and pigment stably disperse and maintain in water in order to apply the first ink composition to the ink jet method. Examples of such methods include a method of dispersing with a resin dispersant such as a water-soluble resin and/or a water-dispersible resin, a method of dispersing with a dispersant, and a method of chemically/physically introducing a hydrophilic functional group to the coloring material particle surface and making dispersion and/or dissolution in water possible without the resin or a dispersant, and the like. However, among these, a method (resin dispersed pigment) of dispersing using a resin dispersant is excellent in the dispersion stability in the ink composition, the ejection stability from the head nozzle holes using the ink jet method, durability such as adhesion and abrasion resistance of the obtained image, and the like, which is preferable.

Examples of the resin dispersant include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonone acid copolymers, vinyl acetate-acrylic acid copolymers, and the like and salts thereof. Among these, a copolymer of a monomer having a hydrophobic functional group and a monomer having a hydrophilic functional group, and a polymer formed of a monomer having both a hydrophobic functional group and a hydrophilic functional group are preferable. As the form of the copolymer, it is possible to use any of a random copolymer, a block copolymer, an alternating copolymer, and a graft copolymer.

It is possible to appropriately select the content ratio of the resin dispersant depending on the coloring material to be dispersed; however, 5 parts by mass or more and 200 parts by mass or less with respect to 100 parts by mass of the coloring material content in the first ink composition is preferable, and 20 parts by mass or more and 120 parts by mass or less is more preferable.

Surfactant

The first ink composition may contain a surfactant. The surfactant has a function of lowering the surface tension and improving the wettability with the recording medium. Among surfactants, it is possible to preferably use, for example, acetylene glycol-based surfactant, silicone-based surfactant, and fluorine-based surfactant.

The acetylene glycol-based surfactant is not particularly limited, but examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (all trade names, manufactured by Air Products and Chemicals, Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (all trade names, manufactured by Nissin Chemical Industry Co., Ltd.), Acetylenol E00, E00P, E40, E100 (all trade names, manufactured by Kawaken Fine Chemicals Co., Ltd.).

The silicone-based surfactant is not particularly limited, and examples thereof include polysiloxane-based compounds. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, BYK-348 (all trade names, manufactured by BYK Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.).

A fluorine-modified polymer is preferably used as the fluorine-based surfactant and specific examples thereof include BYK-340 (trade name, manufactured by BYK Japan K.K.).

In the case of containing a surfactant, the content thereof is preferably 0.1% by mass or more and 2% by mass or less, more preferably 0.2% by mass or more and 1.5% by mass or less, and more preferably 0.5% by mass or more and 1.2% by mass or less with respect to the total mass of the first ink composition.

Other Components

The first ink composition may contain a pH adjuster, an antiseptic/fungicide agent, a chelating agent, a rust inhibitor, and the like, as necessary. Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate and the like. Examples of antiseptic/fungicide agents include sodium benzoate, sodium pentachlorophenol, sodium 2-pyridinethiol-1-oxide, sodium sorbate, sodium dehydroacetate, 1,2-dibenzisothiazolin-3-one, and the like. Examples of commercially available products include Proxel XL 2, Proxel GXL (all trade names, manufactured by Avecia), Denicide CSA, NS-500W (all trade names, manufactured by Nagase ChemteX Corp.), and the like. Examples of the chelating agents include ethylenediamine tetraacetate, iminodisuccinate and the like. Examples of the rust inhibitor include benzotriazole and the like.

1.3. First Drying Step

In the first drying step, 80% by mass or more of water contained in the first ink composition of the first image layer is evaporated.

The first drying step is a step of drying the first ink composition (image) on the recording medium after the step of forming a first image layer. In the first drying step, water contained in the first ink composition (first image layer) attached on the recording medium is evaporated by 80% by mass or more. The evaporation amount of water contained in the first image layer in the first drying step is preferably 85% by mass or more, more preferably 90% by mass or more, and even more preferably 95% by mass or more.

Here, it is possible to measure the evaporation amount of water in the present embodiment, for example, as follows. That is, it is possible to carry out measurement, for example, by setting the mass of ink droplets of the first ink composition ejected to form the first image layer to be 100% and performing analysis by collecting a sample immediately after the first drying step is completed for the formed first image layer and using one or a combination of, for example, thermogravimetric analysis (TGA), gas chromatography (GC), liquid chromatography (LC), or the like.

In the first drying step, a volatile component other than water, specifically, the organic solvent (the first organic solvent) in the first ink composition, or the like may be evaporated. For example, it is preferable that the first drying step be performed so that the evaporation amount of the organic solvent contained in the first ink composition in the first image layer is 50% by mass or less. In addition, in such a case, in the first drying step, the evaporation amount of the organic solvent contained in the first ink composition in the first image layer is preferably 30% by mass or less, more preferably 25% by mass or less, even more preferably 20% by mass or less, particularly preferably 15% by mass or less, still more preferably 10% by mass or less, yet more preferably 5% by mass or less, and even more particularly preferably 3% by mass or less. Due to this, it is possible to obtain a high-quality image in a short time even on a non-ink absorption recording medium such as a plastic film which does not have an ink absorption layer. In addition, even in a case where the surface temperature of the recording medium in the first drying step is relatively low, there is a tendency for the evaporation amount of the water to more easily be 80% by mass or more and, in this case, in the step of forming a first image layer, it is possible to reduce the adverse influence such as clogging of the nozzle holes of the recording head due to heat from the recording medium, which is preferable. Further, this case is preferable in that the adhesion of a recorded material is particularly good. On the other hand, in the first drying step, the lower limit of the evaporation amount of the organic solvent contained in the first ink composition in the first image layer is 0% by mass, preferably more than 50% by mass, more preferably 70% by mass or more, even more preferably 80% by mass or more, and particularly preferably 90% by mass or more. The upper limit of the evaporation rate in this case is 100% by mass or more. This case is preferable in that the image quality and the abrasion resistance of the recorded material are particularly good.

In addition, the water evaporation rate of the volatile component (which indicates all of the volatilizing components including water, an organic solvent, and the like contained in the first ink composition) is not limited, and is preferably 90% by mass or less, more preferably 80% by mass or less, particularly preferably 70% by mass or less, and further more preferably 60% by mass or less. The lower limit in this case is not particularly limited, and is preferably 30% by mass or more, more preferably 40% by mass or more, and further more preferably 50% by mass or more. This case is preferable in that the adhesion of the recorded material is particularly good. On the other hand, from the viewpoints of the abrasion resistance or the like of the recorded material being particularly good, the water evaporation rate of the volatile component is preferably 60% by mass or more, more preferably 70% by mass or more, further more preferably 80% by mass or more, and particularly preferably 90% by mass or more. The upper limit of the water evaporation rate of the volatile component in this case is not particularly limited, and is preferably 100% by mass or less and more preferably 98% by mass or less. Examples of the volatile component also includes a surfactant or the like if it is a component which volatilizes, in addition to the above described water and the organic solvent. Components that is subjected to a second drying step described below and do not remain on the recorded material thereafter are volatile components.

The first drying step is not particularly limited as long as it is a method of promoting the evaporation of water present in the ink. Examples of the method used in the first drying step include a method of adding heat to the recording medium, a method of blowing air onto the image on the recording medium after the step of forming a first image layer, a method combining the above, and the like. Specifically, as the means used in these methods, for example, forced air heating, radiation heating, conductive heating, high frequency drying, microwave drying, and the like are preferably used.

In addition, the first drying step may be performed by heating and blowing air (that is, warm air), or may be performed by a combination of the air blowing means and the heating means described above. Examples of a means for blowing air include a known drying apparatus such as a dryer.

In addition, in the first drying step, air blowing may be performed while heating the recording surface as necessary. For the air blowing in the first drying step, the blowing speed is 0.1 m/s or more and 5 m/s or less, the blowing speed is preferably 0.2 m/s or more and 3 m/s or less, the blowing speed is more preferably 0.3 m/s or more and 2 m/s or less, and the blowing speed is more preferably 0.5 m/s or more and 1 m/s or less. Within this range, it is possible to reduce image distortion due to wind while the drying is proceeding. Within such a range, it is possible to easily evaporate water contained in the first image layer by 80% by mass or more.

In addition, "air blowing" in the present embodiment includes blowing air onto the ink layer provided on the recording surface, and allowing wind to pass over the surface of the recording surface without directly blowing air onto the ink layer (that is, generating an airflow near the surface of the recording surface).

It is possible to perform the first drying step at at least one timing of before, during, or after ejection of the first ink composition. Further, the first drying step preferably includes air blowing, due to which it is possible to effectively evaporate (volatilize) water included in the first image layer.

The surface temperature of the recording medium in the first drying step is preferably 50° C. or less, more preferably 45° C. or less, and even more preferably 40° C. or less. The surface temperature of the recording medium in the first drying step is preferably 25° C. or more, more preferably 30° C. or more, and even more preferably 35° C. or more. Within such a range, it is possible to easily evaporate water contained in the first image layer by 80% by mass or more. Furthermore, the surface temperature of the recording medium in the first drying step is preferably a temperature lower than the surface temperature of the recording medium in the second drying step to be described below. By doing so, it is possible to suppress the flow of the resin component in the second drying step. Note that, in the present embodiment, in a case where the first drying step is performed using a plurality of mechanisms, such as a case of combining a plurality of forced air heating, radiant heating, conductive heating, high frequency drying, microwave drying, and the like, it is also possible to set different temperatures to be achieved by each mechanism. In such a case, in a case where a temperature of the recording medium heated by each mechanism in the first drying step differs, for example, in a case where a temperature differs depending on places of the recording medium being heated by each mechanism, a place having the highest surface temperature of the recording medium is defined as the temperature of the first drying step. Further, such a temperature is a temporal average temperature obtained during recording a place having the highest temperature of the recording medium. The same also applies to the second drying step described below.

In addition, the drying time in the first drying step (that is, the time for performing air blowing and heating) is not particularly limited as long as the time is set so that the drying rate of each layer falls within a range to be described below. However, the drying time in the first drying step (that is, the time for performing air blowing, heating, and the like) depends on the composition of the first ink composition and is, for example, 0.1 seconds or more and 100 seconds or less, preferably 0.2 seconds or more and 50 seconds or less, more preferably 0.5 seconds or more and 30 seconds or less, and even more preferably 1 second or more and 10 seconds or less. Within such a range, it is possible to easily evaporate water contained in the first image layer by 80% by mass or more.

Note that, in the first drying step, with "evaporate 80% by mass or more of water", most of the organic solvent may remain unevaporated at this time. In particular, in a case where the first drying step is carried out under a relatively low temperature condition of 50° C. or less, preferably 40° C. or less, water is mainly evaporated instead of the organic solvent, and the organic solvent is often slightly or not at all evaporated. However, by performing the first drying step at the temperature and time described above, there is an advantage in terms of simplifying the drying mechanism provided in the apparatus and shortening the necessary time for recording. However even in a case where the organic solvent remains, it is understood that bleeding or the like is sufficiently reduced.

In addition, even in a case where the surface temperature of the recording medium in the first drying step is set relatively low as in the above described range, the evaporation amount of the water is likely to be 80% by mass or more and, in this case, in the step of forming a first image layer, a second image layer as described below, and a third image layer if necessary, it is possible to reduce the adverse influence such as clogging of the nozzle holes of the recording head due to heat from the recording medium, which is preferable.

1.4. Step of Forming Second Image Layer

The step of forming a second image layer is performed by ejecting a second ink composition which includes water, and a second organic solvent by which the first resin particles dissolve or swell on the first image layer subjected to the first drying step using the ink jet method.

The first image layer subjected to the first drying step has a water content of less than 20% by mass. Therefore, even when the second ink composition is attached, bleeding of the obtained image is unlikely to occur. In this step, the second ink composition is ejected by the ink jet method. Note that the ink jet recording apparatus which attaches the second ink composition and the ink jet recording apparatus which attaches the first ink composition may be the same or different. In addition, in a case of being the same, it is possible to eject each ink composition at appropriate timings from different recording heads and/or nozzles of the ink jet recording apparatus being used. Description will be given below of the second ink composition.

1.4.1. Second Ink Composition

The second ink composition contains at least an organic solvent and water. In the present specification, an organic solvent contained in the second ink composition is referred to as the second organic solvent. That is, in the present specification, the term "the second organic solvent" means "the organic solvent contained in the second ink composition". The second ink composition contains at least an organic solvent by which the resin particles contained in the first ink composition dissolve or swell among various organic solvents described below. In addition, the second ink composition may contain an organic solvent by which the resin particles contained in the first ink composition do not dissolve or swell. Such an organic solvent can be selected from examples described below. Further, in a case where the second ink composition is used as a colored ink composition, if the first ink composition is a background image ink composition, it is possible to obtain the recorded material in which a colored image in formed on a background image.

1.4.1.1. Organic Solvent

The second organic solvent is an organic solvent contained in the second ink composition. The second ink composition contains at least an organic solvent by which the resin particles contained in the first ink composition (first image layer) can dissolve or swell, as the second organic solvent. Due to this, even if the first image layer is dried, the second ink composition is imparted to such an image, and at least a part of resin particles present in the first image layer can dissolve and/or swell. Therefore, it is possible that adhesion (durability) between the first image layer and the second image layer becomes good.

The second ink composition may contain a plurality types of organic solvents.

The second ink composition contains at least one type of an organic solvent by which the resin particles contained in the first ink composition dissolve or swell. Such a type of organic solvents depends on the resin particles contained in the first ink composition. In addition, the second ink composition may contain a plurality of types of organic solvents. That is, in addition to the organic solvent by which the resin particles contained in the first ink composition dissolve or swell, the second ink composition may contain the other organic solvents (organic solvent by which the resin particles contained in the first ink composition do not dissolve or swell). The other organic solvents can be selected from organic solvents exemplified below, and the types thereof depend the resin particles contained in the first ink composition. The other organic solvents can be selected from the organic solvents exemplified in the section of the first ink composition.

The second ink composition contains at least the organic solvent by which the resin particles contained in the first ink composition (first image layer) can dissolve or swell. Such an organic solvent can be selected from the organic solvents exemplified in the section of the first ink composition, and among these, the organic solvent is an organic solvent by which at least a part of the resin particles contained in the first ink composition dissolve and/or swell. In addition, the organic solvent by which the first resin particles do not dissolve and/or swell can be selected from the organic solvents exemplified in the section of the first ink composition.

As for the organic solvent contained in the second ink composition by which the resin particles contained in the first ink composition dissolve or swell, an organic solvent that has an SP value close to an SP value (solubility parameter) of the resin particles contained in the first ink composition can be selected.

Due to this, the resin particles contained in the first ink composition can dissolve and/or swell. The closer both the SP values get, the easier the resin particles contained in the first ink composition dissolve and/or swell, and the farther the SP values get, the harder the resin particles dissolve or swell. In addition, a unit of the SP value is $(cal/cm^3)^{1/2}$. The SP value is based on the idea that "two materials where interaction therebetween are similar easily dissolve in another", and is a value developed by Charles M. Hansen (also referred to as an HSP). In many cases, the SP value is described in various documents since the SP value can be calculated by estimation, and also can be experimentally and empirically obtained.

A type of the second organic solvents is the same as that of the first organic solvent described above, but selection of an organic solvent depends on the types of the resin particles contained in the first ink composition. A type of organic solvents contained in the second ink composition may be selected in consideration of an SP value of the resin particles contained in the first ink composition. The SP value of the resin particles can be changed by for example, a monomer composition.

An SP value of the organic solvent contained in the second ink composition by which the resin particles contained in the first ink composition dissolve and/or swell, is within $\pm 1$ (unit: $(cal/cm^3)^{1/2}$) with respect to an SP value of the resin particles contained in the first ink composition, is preferably within $\pm 0.9$, more preferably within $\pm 0.8$, and further more preferably within $\pm 0.7$. By setting the SP value as above, the first resin particles can easily dissolve or swell by the second organic solvent. Therefore, it is possible to further improve adhesion between the first image layer and the second image layer.

In the present specification, the expression of "an organic solvent by which resin particles dissolve or swell" means an organic solvent of which a difference between an SP value thereof and an SP value of resin particles is within ±1.5, preferably within 1.2, and more preferably within ±1.0. In addition, the expression of "an organic solvent by which resin particles do not dissolve and swell" means an organic solvent of which a difference between an SP value thereof and an SP value of resin particles is more than ±1.5, preferably ±2 or more, and more preferably ±3 or more.

The second ink composition may contain a plurality types of the second organic solvent. The total content of the second organic solvent in the second ink composition is 1% by mass or more and 50% by mass or less, preferably 2% by mass or more and 45% by mass or less, more preferably 3% by mass or more and 40% by mass or less, and even more preferably 10% by mass or more and 35% by mass or less with respect to the total mass of the second ink composition. In addition, the second ink composition may contain one or more type of an organic solvent (an organic solvent by which resin particles do not dissolve and swell) other than the second organic solvent. The total content of the organic solvent in the second ink composition is 1% by mass or more and 60% by mass or less, preferably 2% by mass or more and 50% by mass or less, more preferably 3% by mass or more and 45% by mass or less, and even more preferably 10% by mass or more and 40% by mass or less with respect to the total mass of the second ink composition.

Note that, in the second ink composition, the content of the organic solvent having a normal boiling point of higher than 250° C. is 2% by mass or less. In this case, the ink may or may not contain the organic solvent having a normal boiling point of higher than 250° C., and in a case where the organic solvent is contained, the content is as described above or less. By setting the content of the organic solvent having a normal boiling point of higher than 250° C. to be within the range described above, it is possible to prevent the drying property of the ink from being significantly lowered. As a result, it is possible to prevent the fixability of an image from deteriorating when for example, performing recording on a soft packaging film. In addition, even if the temperature of the recording medium in the drying step is made to be relatively low, it is possible to sufficiently carry out the drying. Examples of the organic solvent having a normal boiling point of higher than 250° C. include glycerin (normal boiling point of 290° C.)

In addition, the organic solvent contained in the second ink composition may be used alone or in a combination of two or more types, and among these, it is preferable to contain an organic solvent having a normal boiling point of 80° C. or more and 250° C. or less, preferably 100° C. or more and 250° C. or less, and more preferably 120° C. or more and 240° C. or less. In addition, among the organic solvents contained in the ink, the content of the organic solvent having a normal boiling point of higher than 250° C. is preferably 1.5% by mass or less, more preferably 1% by mass or less, and even more preferably 0.5% by mass or less. In this case, it is possible to keep the drying property of the ink high.

1.4.2. Water

Regarding water contained in the second ink composition, it is the same as that of the first ink composition and the detailed description will be omitted.

1.4.3. Other Components

The second ink composition of the present embodiment can contain a wax, a resin dispersant, a surfactant, and the like. Regarding these, it is the same as described in the first ink composition and the detailed description will be omitted. The second ink composition may can contain a coloring material.

As for the coloring material contained in the second ink composition, a white coloring material or a glittering pigment described above in the first ink composition may be used, or a coloring material (non-white) described below may be used.

The second ink composition contains a non-white coloring material. The non-white coloring material means a coloring material other than the white coloring material and the glittering pigment described above. Examples of the non-white coloring material include dyes, pigments, and the like. The non-white coloring material is preferably a coloring material such as cyan, yellow, magenta, or black.

It is possible to suitably use the dyes and pigments, described in U.S. Patent Application Publication No. 2010/0086690, U.S. Patent Application Publication No. 2005/0235870, International Publication No. 2011/027842, and the like. Between dyes and pigments, it is more preferable to include a pigment. The pigment is preferably an organic pigment from the viewpoint of storage stability such as light fastness, weather resistance, and gas resistance.

Specifically, as the pigments, azo pigments such as insoluble azo pigments, condensed azo pigments, azo lakes, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigment; dye chelates, dye lakes, nitro pigments, nitroso pigments, aniline black, daylight fluorescent pigments, carbon black, and the like may be used. It is also possible to use the pigments described above as one type or in a combination of two or more types.

In addition, as the dye, it is possible to use various dyes used in normal ink jet recording such as direct dyes, acidic dyes, edible dyes, basic dyes, reactive dyes, disperse dyes, vat dyes, soluble vat dyes, and reactive disperse dyes.

The content of the coloring material is preferably 0.3% by mass or more and 20% by mass or less, and more preferably 0.5% by mass or more and 15% by mass or less with respect to the total mass of the second ink composition.

The non-white (color) coloring material may be used for the first ink composition. In this case, the white coloring material can be used for the second ink composition. In this case, if the recording medium is translucent or transparent, a formed image has a white image (the second image layer) on the background when seen from the recording medium side, and an image (recorded material) having a colored image (the first image layer) can be formed on the foreground. From the viewpoint that a background image layer and another image layer formed by being overlapped to the background image layer can be formed on the recording medium, it is preferable that one of the first ink composition and the second ink composition be an ink composition containing the white coloring material or the glittering pigment, and the other be an ink composition containing the non-white coloring material. Further in this case, the first ink compositions of the same composition or of different compositions may be used for both of the composition containing the white coloring material or the glittering pigment, or the composition containing the non-white coloring material.

The second ink composition may contain a resin dispersant, a wax, a surfactant, a pH adjuster, an antiseptic/ fungicide, a chelating agent, a rust inhibitor, and the like. For the second ink composition, it is possible to use any of a resin dispersed pigment, a dispersant dispersed pigment, and a surface treated pigment, and it is also possible to use these in the form of a mixture of plural types as necessary; however, it is preferable to contain a resin dispersed pigment.

Specific examples of the components such as a resin dispersant, a wax, a surfactant, a pH adjuster, an antiseptic/fungicide, a rust inhibitor, and the like which are able to be used in the second ink composition, the effects of each agent, the content ranges thereof, and the like are the same as in the contents described for the first ink composition, thus description thereof will be omitted.

The second ink composition may contain at least one type of the resin particles explained in the section of the first ink composition. Examples of usable resins forming the resin particles contained in the second ink composition include an acrylic-based resin, a fluorene-based resin, a urethane-based resin, an olefin-based resin, a rosin modified resin, a terpene-based resin, an ester-based resin, an amide-based resin, an epoxy-based resin, a vinyl chloride-based resin, a vinyl chloride-vinyl acetate copolymer, an ethylene vinyl acetate-based resin, and the like. It is possible to use these resins as one type or in a combination of two or more types. Among these resins, from the viewpoint of further improving at least one of the adhesion of the second image layer to the first image layer, and the abrasion resistance of the second image layer, the material of the resin particles contained in the second ink composition is more preferably at least one type selected from an ester-based resin, an acrylic-based resin, and a styrene-acrylic-based resin. In addition, from the viewpoint that the adhesion of the second image layer to the first image layer can be further improved, it is further more preferable that the material of the resin particles contained in the first ink composition and the material of the resin particles contained in the second image layer be the same.

1.5. Other Steps 1.5.1. First Drying Step after Forming Second Image Layer

After the step of forming the second image layer by the second ink composition, the drying step is performed so as to evaporate water in the second image layer. This drying step may be the same as the first drying step after forming the first image layer described above, and therefore this step also will be referred to as "the first drying step". That is, the first drying step is a step of evaporating 80% by mass or more of water contained not only in the first ink composition of the first image layer, but also in the second ink composition of the second image layer on the first image layer, and if necessary, in a clear ink composition of a third image layer on the second image layer which will be described below.

The first drying step is not particularly limited as long as 80% by mass or more of water contained in the second image layer evaporates, and is preferably a step using the same mechanism, apparatus, and method used in the first drying step described above. The detailed description of the mechanism, apparatus, method, and the like may be the same as that of the first drying step described above, and therefore will be omitted.

It is possible to prevent the flow of a resin component or the like of the whole image in the second drying step described below by performing such a first drying step after forming the second image layer. Further, when forming the third image layer formed of the clear ink composition described below on the second image layer, the flow of a resin component or the like is prevented, and the effect of obtaining an image with less bleeding is exhibited, which is preferable.

The preferable evaporation rate of the volatile component in the image layer (containing water) in such a first drying step is the same as that of the first drying step described above, and the detailed description will be omitted.

1.5.2. Step of Forming Third Image Layer

The ink jet recording method of the present embodiment may include a step of forming the third image layer by ejecting the clear ink composition containing third resin particles, a third organic solvent, and water on the first image layer and the second image layer using the ink jet method, after forming the second image layer by the second ink composition and performing the first drying step thereafter. The third image layer is formed on the first image layer and the second image layer, and may be formed on a region of the first image layer where the second image layer is not formed, or on a region of the recording medium where the first image layer is not formed.

The third image layer is formed of the clear ink composition, and functions as a protective layer which protects an image formed on the recording medium. Forming the third image layer makes it possible to further improve the abrasion resistance of the image. The clear ink composition is an ink composition used for improving the qualities such as the glossiness, abrasion resistance, and adhesion of the recorded material and is not an ink composition used to color the recording medium. The content of the coloring material in clear ink composition is preferably 0.1% by mass or less, and more preferably 0.05% by mass or less. It is further more preferable that the coloring material be not contained. It is possible for the clear ink composition to be a topcoat ink composition.

In a case where this step is carried out, the clear ink composition is ejected by the ink jet method. The ink jet method is the same as that of the step of forming the first image layer. Note that, the ink jet recording apparatus for attaching the clear ink composition and the ink jet recording apparatus for attaching the first ink composition and/or the second ink composition may be the same or different. In addition, in a case of being the same, it is possible to eject each ink composition at appropriate timings from different recording heads and/or nozzles of the ink jet recording apparatus being used.

In addition, in a case of performing the step of forming the third image layer, this step may be performed after performing the above described first drying step and then evaporating 80% by mass or more of total water contained in the first ink composition and the second ink composition. By doing so, a target to which clear ink is to be attached (at least one type of the recording medium, the first image layer, and the second image layer) has a water content of less than 20% by mass. Therefore, even when the clear ink composition is attached, bleeding of the obtained image occurs less likely.

1.5.2.1. Clear Ink Composition

The clear ink composition contains resin particles, an organic solvent, and water. In the present specification, the clear ink composition is referred to as the third ink composition in some cases. The organic solvent contained in the third ink composition is referred to as the third organic solvent. That is, in the present specification, the term "the third organic solvent" means "the organic solvent contained in the third ink composition". The third ink composition may contain an organic solvent by which the resin particles contained in the first ink composition and/or the second ink composition described above dissolve or swell among various organic solvents described below. In addition, the third ink composition may contain an organic solvent by which the resin particles contained in the first ink composition and/or the second ink composition described above do not dissolve or swell.

1.5.2.1.1. Resin Particles

The clear ink composition contains at least one type of resin particles described in the first ink composition. The resin particles contained in the clear ink composition (the third ink composition) are referred to as the third resin particles. Examples of the resin forming the resin particles included in the clear ink composition include acrylic-based resins, fluorene-based resins, urethane-based resins, olefin-based resins, rosin modified resins, terpene-based resins, ester-based resins, amide-based resins, epoxy-based resins, vinyl chloride-based resins, vinyl chloride-vinyl acetate copolymers, ethylene vinyl acetate-based resins, and the like. It is possible to use these resins as one type or in a combination of two or more types. In addition, among these resins, the material of the resin particles included in the clear ink composition is more preferably at least one type selected from an ester-based resin, an acrylic-based resin, and a styrene-acrylic-based resin from the viewpoint that it is possible to further improve at least one of the adhesion of at least one layer of the recording medium of the third image layer, the first image layer, and the second image layer, and the abrasion resistance of the third image layer. Furthermore, it is more preferable from the viewpoint that it is possible to further improve the adhesion with the ink layer coming into contact with the third image layer when the material of the resin particles included in the clear ink composition is the same as the material of the resin particles included in the first image layer or the second image layer coming into contact with the third image layer.

1.5.2.1.2. Organic Solvent

The clear ink composition (the third ink composition) contains the third organic solvent. The organic solvent contained in the third ink composition is referred to as the third organic solvent. The third organic solvent is not particularly limited as long as it is an organic solvent, and examples thereof include alkyl polyols, pyrrolidone derivatives, glycol ethers, and the like. These organic solvents may be used alone as one type, or two or more types may be used in combination. Note that since the specific examples, effects, content ranges and the like of each of the organic solvents are the same as those described for the first ink composition, and description thereof will be omitted.

In the same manner as the first ink composition, the clear ink composition preferably does not contain an organic solvent having a normal boiling point of higher than 250° C. by more than 2% by mass.

It is preferable that the third organic solvent be an organic solvent by which at least a part of the resin particles contained in the second ink composition (second image layer) described above and the resin particles contained in the first ink composition (first image layer) described above can dissolve or swell. Due to this, even if at least one of the second image layer or the first image layer is dried, the third ink composition is imparted to such an image, and the resin particles in the lower layer can dissolve and/or swell. Therefore, it is possible that the adhesion (durability) of the third image layer (overcoat layer) to the first image layer or the second image layer further becomes good.

The clear ink composition may contain a plurality types of organic solvents. In addition, the clear ink composition may contain the other organic solvents (by which the resin particles in the lower layer do not dissolve or swell). The other organic solvents can be selected from organic solvents exemplified in the section of the first ink composition described above.

As for the organic solvent contained in the third ink composition, it is more preferable that an organic solvent that has an SP value close to an SP value (solubility parameter) of the resin particles in the lower layer be selected. Due to this, the resin particles in the lower layer can dissolve and/or swell. The closer both the SP values get, the easier the resin particles dissolve and/or swell, and the farther the SP values get, the harder the resin particles dissolve or swell.

In addition, even in a case where the organic solvent contained in the third ink composition is used as one type alone or in a combination of two or more types, all the solvents are preferably organic solvents having a normal boiling point of 250° C. or less. Not including an organic solvent having a normal boiling point of higher than 250° C. by more than 2% by mass makes it possible to maintain the drying property of the ink to be high.

The clear ink composition may contain a plurality types of the organic solvent. The total content of the organic solvent in the clear ink composition is 1% by mass or more and 60% by mass or less, preferably 2% by mass or more and 50% by mass or less, more preferably 3% by mass or more and 45% by mass or less, and further more preferably 10% by mass or more and 40% by mass or less with respect to the total mass of the clear ink composition.

1.5.2.1.3. Water

The clear ink composition contains water. Water is the main medium of the clear ink composition and is a component which is evaporated and dispersed by drying. Since the water is the same as that of the first ink composition, description thereof will be omitted.

The clear ink composition is a so-called water-based ink which includes water as the main solvent (containing 40% by mass or more of water). The water-based ink has advantages in that the odor is suppressed and the ink is good for the environment since 40% by mass or more of the composition is water.

1.5.2.1.4. Other Components

The clear ink composition may contain a wax, a surfactant, a pH adjuster, an antiseptic/fungicide, a chelating agent, a rust inhibitor, and the like. Since the specific examples of the components, effects of each agent, content ranges and the like are the same as the contents described for the first ink composition, description thereof will be omitted.

1.5.2.2. First Drying Step after Forming Third Image Layer

After the step of forming the third image layer by the clear ink composition, the drying step is performed so as to evaporate water in the third image layer. This drying step may be the same as the first drying step after forming the first image layer described above, and therefore this step also will be referred to as "the first drying step". That is, the first drying step is a step of evaporating 80% by mass or more of water contained not only in the first ink composition of the first image layer, but also in the second ink composition of the second image layer on the first image layer, and if necessary, in the clear ink composition of the third image layer on the second image layer.

The first drying step is not particularly limited as long as 80% by mass or more of water contained in the third image layer evaporates, and is preferably a step using the same mechanism, apparatus, and method used in the first drying step described above. The detailed description of the mechanism, apparatus, method, and the like may be the same as that of the first drying step described above, and therefore will be omitted.

Since it is possible to prevent the flow of a resin component or the like of the whole image in the second drying step described below by performing such a first drying step after forming the third image layer, bleeding caused by excessive mixing of the components in each image layer is unlikely to occur. Therefore, the effect of obtaining an image with less bleeding is exhibited, which is preferable.

The preferable evaporation rate of the volatile component in the image layer (containing water) in such a first drying step is the same as that of the first drying step described above, and the detailed description will be omitted.

1.5.3. Second Drying Step

The ink jet recording method according to the present embodiment include the second drying step of evaporating volatile components on the recording medium after the step of the first drying step in which the first image layer, the second image layer, and if necessary, the third image layer are formed, and evaporating 80% by mass or more of water contained in the layer after forming each image layer. In the second drying step, the volatile components (water, alkylpolyol, glycol ether, and the like) contained in the first image layer, the second image layer, and if necessary, the third image layer are evaporated. That is, this step is a final drying step in which after forming a predetermined image (the first image layer and the second image layer, and if necessary, the third image layer), the volatile components remained in the whole image on the recording medium are evaporated.

In the drying performed in the second drying step, since the first image layer, the second image layer, and if necessary, the third image layer are dried to a predetermined water amount through the first drying step, it is possible to suppress the flow of ink droplets forming the second image layer or the third image layer of the uppermost surface. Due to this, since it is possible to retain the ink droplets of the second ink composition or the clear ink composition of the uppermost surface at the positions where the ink droplets are attached, it is possible to suppress bleeding of the image caused by excessive mixing of the components contained in each layer.

The second drying step is performed under a condition in which it is easier to dry the volatile components than in the first drying step. In this case, the method used in the second drying step is not particularly limited as long as it is a method in which the means which is used promotes the evaporation of the volatile components present in the ink composition; however, in a case of using the same method as the method used in the first drying step (for example, a method of applying heat to a recording medium, a method of blowing air onto an image on a recording medium, a method of combining the above, or the like), the method is preferably performed with a higher temperature and/or a higher air flow rate than a first heating step.

For example, in the second drying step, air blowing may be performed while heating the recording surface. In this case, the air blowing in the second drying step is preferably performed at an air speed of 5 m/s or more, an air speed of 6 m/s or more and 50 m/s or less, preferably an air speed of 6 m/s or more and 40 m/s or less, and more preferably an air speed of 7 m/s or more and 30 m/s or less. Performing the drying at an air speed of 6 m/s or more makes it possible to improve the evaporation speed of the volatile components, and performing the drying at an air speed of 50 m/s or less makes it possible to reduce disturbances in the image due to the wind while maintaining the drying property. Furthermore, in this case, the surface temperature of the recording medium in the second drying step is not particularly limited, and is preferably equal to or higher than temperature in the first drying step described above, more preferably 60° C. or more, further more preferably 70° C. or more, and particularly preferably 80° C. or more. In addition, the surface temperature of the recording medium in the second drying step is preferably 150° C. or less, and more preferably 130° C. or less.

The drying time in the second drying step (that is, the time for performing air blowing and heating) is preferably twice or more the drying time in the first drying step, more preferably 3 times or more, and further more preferably 3 times or more and 30 times or less. In this manner, by setting the drying time in the second drying step to be twice or more the drying time in the first drying step, the evaporation of the volatile components is sufficiently performed, and thus it is possible to obtain an image excellent in abrasion resistance. In addition, by setting the drying time to 30 times or less, it is possible to shorten the drying time while sufficiently evaporating the volatile components.

As above, the preferable conditions in the second drying step are described, and it is preferable to appropriately determine the conditions of the second drying step by adding conditions of the recording medium being used such as heat resistant temperature.

1.6. Operational Effect

According to the ink jet recording method of the present embodiment, since the second organic solvent by which the first resin particles contained in the first ink composition dissolve or swell is contained in the second ink composition, even the second image layer is formed after evaporating 80% by mass or more of water in the first image layer, the adhesion between the first image layer and the second image layer is good, and therefore it is possible to form an image excellent in durability. In addition, since it is possible to evaporate 80% by mass or more of water in the first image layer and then form the second image layer, it is possible to suppress the bleeding. Furthermore, since the content of an organic solvent having a normal boiling point of higher than 250° C. in the first ink composition and the second ink composition is 2% by mass or less, respectively, it is possible to further suppress the bleeding of an image.

2. Ink Jet Method

It is possible to perform the ink jet recording method according to the present embodiment using an ink jet recording apparatus having a recording head. Description will be given of the ink jet recording apparatus used in the ink jet recording method according to the present embodiment.

It is possible to use either a serial type or a line type ink jet recording apparatus. In these types of ink jet recording apparatuses, a recording head is mounted, and liquid droplets of the ink composition are ejected from the nozzle holes of the recording head at a predetermined timing and at a predetermined volume (mass) while changing the relative positional relationship between the recording medium and the recording head, and it is possible to form a predetermined image by attaching a first ink composition to the recording medium.

For the ink jet recording apparatus used in the present embodiment, it is possible to employ a well-known configuration such as, for example, a drying unit, a roll unit, and a winding apparatus without limitation. In addition, the ink jet recording apparatus is able to have transport means which transports a recording medium, image layer forming means which records an image (ink layer) by using an ink composition, ink layer drying means, whole-body drying means for heating and air-blowing the recording surface, and the like.

It is possible to form the transport means of, for example, a roller. The transport means may have a plurality of rollers. As long as the transport means is able to transport the recording medium, the position and number of the transport means to be provided are optional. The transport means may include a paper feed roll, a paper feed tray, a paper discharge roll, a paper discharge tray, various platens, and the like.

The image layer forming means ejects the first ink composition, the second ink composition, and the clear ink composition of the present embodiment as necessary onto the recording surface of the recording medium to record the first to third image layers. The image layer forming means is provided with a recording head provided with nozzles, and the recording heads may be different for each ink, or a nozzle array may be assigned for each ink.

It is possible for the ink layer drying means to perform at least one of the first and second drying steps. The ink layer drying means is used for drying the image layer formed on the recording surface or for removing volatile components on the recording medium. The ink layer drying means may be provided at any position in consideration of the timing at which the first and second drying steps are performed, the transport path of the recording medium, and the like, and any number thereof may be provided. Examples of the image layer drying means include a method of applying heat to the recording medium by heating the platen or the like, a method of blowing air onto the image on the recording medium, a method of combining theses, and the like. Specifically, the means used in these methods may be forced air heating, radiation heating, conductive heating, high frequency drying, microwave drying, or the like.

3. Method for Preparing Ink

The first ink composition, the second ink composition, and the clear ink composition described above are obtained by mixing the components described above in an optional order and removing impurities by filtering or the like as necessary. As a method of mixing the respective components, a method in which materials are sequentially added to a container provided with a stirring device such as a mechanical stirrer, a magnetic stirrer, and the like, and then stirred and mixed is suitably used. As a filtration method, it is possible to perform centrifugal filtration, filter filtration and the like as necessary.

4. Physical Properties of Ink

From the viewpoint of the balance between the image quality and the reliability as an ink jet ink, the first ink composition, the second ink composition, and the clear ink composition described above preferably have a surface tension at 20° C. of 15 mN/m or more and 50 mN/m or less, and more preferably 20 mN/m or more and 40 mN/m or less. Note that, it is possible to measure the surface tension, for example, by confirming the surface tension when a platinum plate is wetted with an ink composition under an environment of 20° C. using an automatic surface tensiometer CBVP-Z (trade name, manufactured by Kyowa Interface Science Co., Ltd.).

In addition, from the same viewpoint, the viscosity of each of the ink compositions described above at 20° C. is preferably 2 mPa·s or more and 15 mPa·s or less, and more preferably 2 mPa·s or more and 10 mPa·s or less. Note that, it is possible to measure the viscosity under an environment of 20° C. using, for example, a viscoelasticity tester MCR-300 (trade name, manufactured by Pysica Co.).

5. Ink Set

An ink set of the present embodiment includes the first ink composition described above and the second ink composition described above. In the ink set of the present embodiment, the first ink composition is attached to the recording medium by the ink jet method, and after 80% by mass or more of water contained in the first ink composition is evaporated, the second ink composition is attached to the first ink composition on the recording medium by the ink jet method.

According to such an ink set, the second organic solvent by which the first resin particles contained in the first ink composition dissolve or swell is contained in the second ink composition, and the content of an organic solvent having a normal boiling point of higher than 250° C. in the first ink composition and the second ink composition is 2% by mass or less, respectively. Therefore, even the second image layer is formed after evaporating 80% by mass or more of water in the first image layer, the adhesion between the first image layer and the second image layer is good, and thus it is possible to form an image excellent in durability. In addition, since it is possible to evaporate 80% by mass or more of water in the first image layer and then form the second image layer, it is possible to suppress the bleeding.

6. Ink Jet Ink Composition

It is already described that the first ink composition, the second ink composition, and the clear ink composition described above may contain a plurality types of organic solvents.

That is, it is possible to express following matters. At least one of the first ink composition, the second ink composition, and the clear ink composition described above contains resin particles, organic solvent, and water. The organic solvent includes an organic solvent A by which the resin particles do not dissolve and swell, and an organic solvent B by which the resin particles dissolve or swell. The content of an organic solvent having a normal boiling point of higher than 250° C. with respect to the entirety of the ink jet ink composition is 2% by mass or less.

In the ink jet ink composition, it is possible to perform mixing so that the total content of the organic solvent A is equal to or more than the total content of the organic solvent B. If setting the ink jet ink composition in this manner, since the content of the organic solvent A is equal to or more than the content of the organic solvent B, even if for example, water is evaporated in the vicinity of a nozzle of a recording head, the state that the content of the organic solvent A is more than the content of the organic solvent B can be maintained. Due to this, the generation of a thickening product, a filmed product, or the like caused by dissolving and/or swelling of resin particles present in the ink composition is suppressed, and therefore it is possible to suppress clogging. Furthermore, since the content of an organic solvent having a normal boiling point of higher than 250° C. with respect to the entirety of the ink jet ink composition is 2% by mass or less, the drying property after attaching the ink jet ink composition to the recording medium is good.

Furthermore, in the ink jet ink composition, it is possible to select an organic solvent having a normal boiling point of 100° C. or higher and 250° C. or less for both the organic solvent A and the organic solvent B. In this manner, it is possible that clogging of a nozzle is unlikely to be generated and the drying property after attaching the ink jet ink composition to the recording medium becomes further good.

In addition, in the ink jet ink composition, in the organic solvent A, the content of the organic solvent A having a normal boiling point of higher than that of the organic solvent B of which a normal boiling point is highest in the organic solvent B, can be set equal to or less than the content of the organic solvent B of which a normal boiling point is highest. That is, the mass ratio of the organic solvent A and the organic solvent B may be reversed during the drying step such that the organic solvent A is in a rich state before ejecting the ink jet ink composition from a recording head, and the organic solvent B is likely to be in a rich state in a case where the ink jet ink composition is attached to the recording medium and then dried. In this manner, resin particles are unlikely to dissolve or swell before the ejection, and therefore clogging of a nozzle is unlikely to be generated. Furthermore, resin particles dissolve or swell by proceeding of the drying, and therefore forming a film of a resin becomes easy, and it is possible to form an image excellent in rub fastness.

In such an ink jet ink composition, even if water is evaporated in the vicinity of a nozzle of a recording head, the state that the content of the organic solvent A is more than the content of the organic solvent B can be maintained. Therefore, clogging is unlikely to be generated. Furthermore, for example, in a case where the ink jet ink composition is attached to the recording medium and then dried, the organic solvent B is likely to be remained. Due to this, in a case where drying is performed on the recording medium, resin particles are further likely to dissolve or swell, and thus it is possible that durability of an image is further good.

It can be understood that the ink jet ink composition of the present embodiment may be applied to the first ink composition, the second ink composition, and/or the clear ink composition used in the ink jet recording method described above, or that conversely, the ratio of the solvent in the ink jet ink composition described in this section may be applied to each ink composition explained in the ink jet recording method described above.

7. Examples and Comparative Examples

More specific description will be given below of the embodiments of the invention using Examples, but the present embodiment is not limited to these Examples.

7.1. Preparation of First Ink Composition, Second Ink Composition, and Clear Ink Composition With the material compositions shown in Table 1, first ink compositions 1-(1) to 1-(5), second ink compositions 2-(1) to 2-(4), and clear ink compositions CL-1 to CL-3, which differ in material composition from each other, were obtained. Each ink composition was prepared by placing the materials shown in Table 1 in a container, stirring and mixing with a magnetic stirrer for 2 hours and then filtering with a membrane filter having a pore size of 5 μm to remove impurities such as dust and coarse particles. Note that, the values in Table 1 all indicate % by mass, and ion exchanged water was added such that the total mass of the ink composition was 100% by mass. Note that, the pigment dispersion was prepared in advance as follows. In addition, each of the numerals in parentheses in the table indicates % by mass of the solid content in the ink composition supplied by the pigment dispersion, % by mass of the solid content in the ink composition supplied by the resin emulsion, and % by mass of the solid content in the ink composition supplied by the wax emulsion.

Preparation of Pigment Dispersion

For the first ink composition (white ink composition) used in Examples and Comparative Examples, a water-insoluble pigment (white coloring material) was used as a coloring material. In addition, a water-insoluble color pigment (cyan pigment) was used as a coloring material for the second ink composition used in Examples and Comparative Examples. When a pigment is added to each ink composition, a resin-dispersed pigment in which the pigment is dispersed in advance with a resin dispersant is used. Specifically, a pigment dispersion was prepared as follows.

Preparation of White Coloring Material Dispersion

First, 4 parts by mass of an acrylic acid-acrylic acid ester copolymer (weight average molecular weight: 25,000, acid value: 180) as a resin dispersant were added and dissolved in 155 parts by mass of ion exchanged water in which 1 part by mass of a 30% ammonia aqueous solution (neutralizing agent) was dissolved. Then, 40 parts by mass of titanium oxide (C.I. Pigment White 6) which is a white pigment were added thereto and a dispersing treatment was performed for 10 hours by a ball mill with zirconia beads. Thereafter, centrifugal filtration with a centrifugal separator was performed to remove impurities such as coarse particles and dust, and the concentration of the white pigment was adjusted to 20% by mass and a white coloring material dispersion was obtained. The particle diameter of the white pigment was 350 nm as an average particle diameter.

Preparation of Cyan Pigment Dispersion

First, 7.5 parts by mass of an acrylic acid-acrylic acid ester copolymer (weight average molecular weight: 25,000, acid value: 180) as a resin dispersant were added and dissolved in 160.5 parts by mass of ion exchanged water in which 2 parts by mass of a 30% ammonia aqueous solution (neutralizing agent) were dissolved. Then, as a cyan pigment, 30 parts by mass of C.I. Pigment Blue 15:3 were added and a dispersing treatment was carried out for 10 hours in a ball mill with zirconia beads. Thereafter, centrifugal filtration with a centrifugal separator was performed to remove impurities such as coarse particles and dust, and the cyan pigment concentration was adjusted to 15% by mass to obtain a cyan pigment dispersion. The particle diameter of the cyan pigment at that time was 100 nm as an average particle diameter.

Other than the compound names, the materials described in Table 1 are as follows.

Polyester-Based Resin Particle Emulsion

The ester-based resin particle emulsion was created as follows. As raw material monomers for the polyester resin, a polyoxypropylene (2.2) adduct of bisphenol A, a polyoxyethylene (2.0) adduct of bisphenol A, hydrogenated bisphenol A, isophthalic acid, fumaric acid, and dibutyltin oxide were mixed and polymerized to obtain a polyester resin.

10 g of the polyester resin with an anionic surfactant (trade name: "Neoperex G-15" manufactured by Kao Corp.) as solid content was mixed with 200 g of methyl ethyl ketone, and dissolved at 25° C. Thereafter, 600 g of ion-exchanged water and 3.0 g of 25% ammonia water were mixed in a 2000 mL stainless steel beaker made of SUS 304 and a dispersion treatment was carried out at 30° C. using an ultrasonic homogenizer (product name: UP-400S, manufactured by DKSH Management Ltd.). Thereafter, the temperature was raised to 50° C., and the methyl ethyl ketone was distilled off under reduced pressure. Thereafter, the solid content was adjusted to 30% by mass with ion-exchanged water to obtain the polyester resin emulsion (Tg: 60° C., SP value: 12.0), which was used.

A styrene-acrylic acid copolymer emulsion and a polyurethane resin emulsion having physical properties described in Table 1 were used.

Nopcoat PEM-17 (trade name, manufactured by San Nopco Ltd., polyethylene wax emulsion, melting point 103° C., 40% dispersion)

BYK-348 (trade name, manufactured by BYK Japan K.K., silicone surfactant)

Surfynol DF-110D (trade name, manufactured by Air Products and Chemicals, Inc., acetylene glycol-based surfactant)

TABLE 1

|  | Material | First ink composition | | | | | Second ink composition | | | | Clear ink composition | | |
| --- | --- | --- | --- | --- | --- | --- | --- | --- | --- | --- | --- | --- | --- |
|  |  | 1-(1) | 1-(2) | 1-(3) | 1-(4) | 1-(5) | 2-(1) | 2-(2) | 2-(3) | 2-(4) | CL-1 | CL-2 | CL-3 |
| Coloring material | Coloring material for background: metal oxide dispersion (metal oxide content: 20% by mass, dispersed resin content: 2% by mass) | 50 (11) | 50 (11) | 50 (11) | 50 (11) | 50 (11) | — | — | — | — | — | — | — |
|  | Coloring material for coloring: organic pigment dispersion (pigment content: 15% by mass, dispersed resin content: 3.75% by mass) | — | — | — | — | — | 33.33 (6.25) | 33.33 (6.25) | 33.33 (6.25) | 33.33 (6.25) | — | — | — |
| Resin particles | Styrene-acrylic acid copolymer emulsion Tg: 80° C. <40% dispersion> SP value: 13.5 | — | — | 10 (4) | 10 (4) | — | — | — | 7.5 (3) | 7.5 (3) | 12.5 (5) | — | 12.5 (5) |
|  | Polyester resin emulsion Tg: 60° C. <30% dispersion> SP value: 12.0 | — | 13.33 (4) | — | — | 13.33 (4) | — | 10 (3) | — | — | — | 16.67 (5) | — |
|  | Polyurethane resin emulsion Tg: 25° C. <30% dispersion> SP value: 11.0 | 13.33 (4) | — | — | — | — | 10 (3) | — | — | — | — | — | — |
| Wax | Nopcoat PEM-17 (polyethylene wax emulsion) Melting point: 103° C. <40% dispersion> | 2.5 (1) | 2.5 (1) | 2.5 (1) | 2.5 (1) | 2.5 (1) | 2.5 (1) | 2.5 (1) | 2.5 (1) | 2.5 (1) | 5 (2) | 5 (2) | 5 (2) |
| Water-soluble organic solvent | Ethanol Boiling point: 78.4° C. SP value: 13.0 | — | — | — | 10 | — | — | — | — | 5 | — | — | — |
|  | Propylene glycol Boiling point: 189° C. SP value: 14.2 | — | 10 | — | 10 | 10 | 5 | 10 | — | 10 | 10 | 15 | 15 |
|  | 1,3-Butylene glycol Boiling point: 208° C. SP value: 13.6 | 5 | 10 | — | — | 8 | 5 | 10 | 5 | 5 | — | 5 | 10 |
|  | 1,2-Hexanediol Boiling point: 224° C. SP value: 12.2 | 3 | 5 | 3 | 3 | 5 | 3 | 5 | 5 | 5 | 5 | 5 | 5 |
|  | Dipropylene glycol Boiling point: 232° C. SP value: 10.7 | 10 | — | 15 | — | — | 10 | — | 10 | — | 10 | — | — |
|  | 2-Pyrrolidone Boiling point: 245° C. SP value: 12.9 | 8 | 10 | 10 | 5 | 10 | 5 | 10 | 10 | 5 | 5 | 10 | 10 |
|  | Glycerin Boiling point: 290° C. SP value: 16.7 | — | — | — | 2.2 | 2.2 | — | — | — | — | — | — | — |
| Additive | BYK-348 (silicone-based surfactant) | 0.5 | 0.5 | 0.5 | 0.5 | 0.5 | 0.5 | 0.5 | 0.5 | 0.5 | 0.5 | 0.5 | 0.5 |
|  | Surfynol DF110D (acetylene glycol-based surfactant) | 0.3 | 0.3 | 0.3 | 0.3 | 0.3 | 0.3 | 0.3 | 0.3 | 0.3 | 0.3 | 0.3 | 0.3 |
|  | Potassium hydroxide (pH adjuster) | 0.01 | 0.01 | 0.01 | 0.01 | 0.01 | 0.01 | 0.01 | 0.01 | 0.01 | 0.01 | 0.01 | 0.01 |

TABLE 1-continued

| | | First ink composition | | | | | Second ink composition | | | | Clear ink composition | | |
|---|---|---|---|---|---|---|---|---|---|---|---|---|---|
| | Material | 1-(1) | 1-(2) | 1-(3) | 1-(4) | 1-(5) | 2-(1) | 2-(2) | 2-(3) | 2-(4) | CL-1 | CL-2 | CL-3 |
| | Ethylenediamine tetraacetate (chelating agent) | 0.05 | 0.05 | 0.05 | 0.05 | 0.05 | 0.05 | 0.05 | 0.05 | 0.05 | 0.05 | 0.05 | 0.05 |
| | Benzotriazole (rust inhibitor) | 0.02 | 0.02 | 0.02 | 0.02 | 0.02 | 0.02 | 0.02 | 0.02 | 0.02 | 0.02 | 0.02 | 0.02 |
| Water | Ion-exchanged water | Remaining quantity | Remaining quantity | Remaining quantity | Remaining quantity | Remaining quantity | Remaining quantity | Remaining quantity | Remaining quantity | Remaining quantity | Remaining quantity | Remaining quantity | Remaining quantity |
| Composition | Total amount of solvent (solvent B) within range of ±1.0 with respect to SP value of resin particles in ink: % by mass | 10 | 15 | 13 | 25 | 15 | 10 | 15 | 15 | 25 | 15 | 15 | 35 |
| | Total amount of solvent (solvent A) out of range of ±1.0 value with respect to SP value of resin particles in ink: % by mass | 16 | 20 | 15 | 5.2 | 20.2 | 18 | 20 | 15 | 5 | 15 | 20 | 5 |
| Evaluation | Short-term clogging property (left open for one day) | A | A | A | C | A | A | A | A | C | B | A | D |
| | Long-term clogging property (left open for 4 days) | B | A | A | C | A | B | A | B | D | B | A | D |

7.2. Creation of Recorded Material

Recorded materials used for each evaluation were produced in the following manner.

A recording medium (polyester-based film, trade name: TOYOBO ESTER Film E5200, film thickness: 25 μm manufactured by TOYOBO CO., LTD.) was set on a modified machine of an ink jet printer SC-S60650 (trade name, manufactured by Seiko Epson Corp.), and the recording head was filled with the first ink composition, the second ink composition, and the clear ink composition. As a drying mechanism, a blowing mechanism, a heat conduction mechanism, and a radiant heating mechanism (specifically, a rear surface platen heater (first drying mechanism), an infrared irradiation apparatus on a downstream than a platen (second drying mechanism), respectively) were attached to the printer. In Tables 2 to 5, the surface temperatures of the recording medium in the first drying step and the second drying step are the maximum temperatures in the corresponding steps.

The first image layer was ink jet coated on a recording medium at a resolution of 720×720 dpi and an attachment amount of 10.0 mg/inch$^2$ with the ink compositions (refer to Table 1) described in Tables 2 to 5 to form a pattern. The first image layer was heated and dried under the drying conditions described in Tables 2 to 5 during and after ejection.

The first image layer was formed and left on the platen for a predetermined time, the recording medium was reversely sent, and then the second ink composition from the ink composition described in Tables 2 to 5 (refer to Table 1) was recorded by overlapping the region of the first image layer as a pattern smaller than the first image layer at a resolution of 720×720 dpi and an attachment amount of 10.0 mg/inch$^2$. The evaporation rate of water in the first image layer was made to be the rate in the table by controlling a heater and adjusting time. The water amount of ink collected from the recording medium in the same dried state as that of the second ink composition immediately before being attached, was measured by using a Karl Fischer moisture meter (manufactured by HIRANUMA SANGYO Co., Ltd., trace-moisture measurement device, AQ-2200), and the evaporation rate was calculated from the original water amount of ink. In addition, similarly, for the evaporation rate of the organic solvent in the first image layer, the collected ink was measured by using gas chromatography, and the evaporation rate was calculated from the original amount of ink. In addition, the evaporation rate of the volatile components in the first image layer is the total evaporation rate including the evaporation rate of water and the evaporation rate of the organic solvent which were measured in the same manner as above, and the evaporation rate of the volatile components including the evaporation rate of the surfactant that was measured in the same manner as that of the organic solvent since the surfactant is a volatile component (approximate calculation). The evaporation rate is the total rate of the components excluding the solid content in ink remaining in the recorded material after the second drying step. Since the content of the surfactant in ink is smaller than water or the organic solvent, it almost approximates the total evaporation rate of water and the organic solvent.

In addition, in the example of forming the third image layer, the first image layer and the second image layer were dried under the same condition as that of the first drying step, the recording medium was reversely sent, and then the clear ink composition was recorded by overlapping. The coating of the clear ink compositions described in Tables 2 to 5 (refer to Table 1) was performed. The coating amount was set to a resolution of 720×720 dpi and an attachment amount of 7.0 mg/inch$^2$, and regarding the coating region, coating was performed so as to cover the region of the first image layer.

The first drying step was performed under the same condition as that of the first drying step of Example 3.

In addition, in all of the examples, the second drying step was performed with the second drying mechanism on the downstream after completing attachment of ink on the uppermost surface. In the example where the evaporation rate of water is 100% (Examples 27 to 36, Comparative Examples 4, 6, 8, and 9), after attaching the first ink composition and completing the first drying step, a sheet of paper was transported to the second drying mechanism on the downstream, and was dried by performing the second drying step. After that, an image was formed for each example as below.

(Regarding Examples 27 to 31, Comparative Examples and 9): After the second drying step, the second ink composition was attached and the first drying step was completed. After that, the recording medium was dried by performing the second drying step again, and then discharged from the printer to be a final image.

(Regarding Examples 32 to 36, Comparative Examples and 8): After the second drying step, the second ink composition was attached and the first drying step was completed. After that, the clear ink composition was further attached thereto and the first drying step was completed. After that, the recording medium was dried by performing the second drying step again, and then discharged from the printer to be a final image.

In the example in which the third image layer was not formed, each image layer was formed, the first drying step was performed, the second drying step was performed as described above, and then the recording medium was discharged from the printer to be a final image.

In the example in which the third image layer was formed, after forming each image layer, performing the first drying step, and then finally performing the second drying step as described above, the image was dried, and then the recording medium was discharged from the printer to be a final image.

Note that, the surface temperature of the recording medium in the table was measured with a non-contact type thermometer. In a case of using a plurality of mechanisms, the temperature was measured for each place being heated by each mechanism and listed in the respective tables.

Regarding the air blowing conditions in the first drying step in the table, an air stream with a temperature of 40° C. with respect to the recorded material during recording was adjusted such that the air speed on the recording surface of the recording medium was 0.5 m/s or 1 m/s, and air blowing was carried out. In addition, in Example 2, the heater setting of the printer paper guide portion (platen) at the time of recording was set to "set the surface temperature of the recording surface to be 40° C.". Further, for the infrared irradiation, the setting of the irradiation apparatus was set as "set the surface temperature of the recording surface to be 50° C.". In a case of using a plurality of drying mechanisms, the surface temperature of the recording surface is the temperature of a part of the recording medium heated by each drying mechanism. The temperature related to the drying mechanism with the highest temperature is the drying temperature in the corresponding drying step. Furthermore, in a case where the temperature is changed during recording, such temperature is the temporal average temperature.

For the air blowing conditions in the second drying step (post-drying step) in the table, an air stream with a temperature of 90° C. with respect to the recorded material in the recording was adjusted such that the air speed on the recording surface of the recording medium was approximately 20 m/s, and air blowing was carried out. In addition, for the infrared irradiation, the setting of the irradiation apparatus was set to "set the surface temperature of the recording surface to be 80° C.".

TABLE 2

|  |  | Examples | | | | | |
|---|---|---|---|---|---|---|---|
|  |  | 1 | 2 | 3 | 4 | 5 | 6 |
| Types of ink composition and solvent | Ink composition used for first image layer | 1-(1) | 1-(1) | 1-(1) | 1-(1) | 1-(2) | 1-(2) |
|  | Ink composition used for second image layer | 2-(1) | 2-(1) | 2-(1) | 2-(3) | 2-(1) | 2-(2) |
|  | Ink composition used for third image layer | — | — | — | — | — | — |
|  | Presence of solvent by which resin of first image layer dissolves/ swells in second ink composition | Presence | Presence | Presence | Presence | Presence | Presenc |
|  | Presence of solvent by which resin of first/second image layers dissolves/ swells in third ink composition | — | — | — | — | — | — |

TABLE 2-continued

| | | | | | | | | | |
|---|---|---|---|---|---|---|---|---|---|
| First drying step | Air blowing | Air speed (m/s) | 1 | 0.5 | 0.5 | 0.5 | 0.5 | | 0.5 |
| | | Surface temperature (° C.) | 40 | 40 | 40 | 40 | 40 | | 40 |
| | Heat conduction | Rear surface platen (surface temperature: ° C.) | — | 40 | — | — | — | | — |
| | Irradiation with radiation | Infrared radiation (surface temperature: ° C.) | — | — | 50 | 50 | 50 | | 50 |
| Before forming second image layer | Evaporation rate (%) of water in first image layer | | 80 | 90 | 95 | 95 | 95 | | 95 |
| | Evaporation rate (%) of organic solvent in first forming image layer | | 0 | 0 | 0 | 0 | 0 | | 0 |
| | Evaporation rate (%) of volatile component in first image layer | | 55 | 61 | 65 | 65 | 55 | | 55 |
| Second drying step | Air blowing | Air speed (m/s) | 20 | 20 | 20 | 20 | 20 | | 20 |
| | | Surface temperature (° C.) | 90 | 90 | 90 | 90 | 90 | | 90 |
| | Irradiation with radiation | Infrared radiation (surface temperature: ° C.) | 80 | 80 | 80 | 80 | 80 | | 80 |
| Evaluation | Image quality | Bleeding | B | A | A | A | A | | A |
| | Durability | Adhesion (tape peeling) | A | A | A | A | A | | A |
| | | Abrasion resistance | B | B | B | B | B | | B |

| | | Examples | | | | | | | | |
|---|---|---|---|---|---|---|---|---|---|---|
| | | 7 | 8 | 9 | 10 | 11 | 12 | 13 | 14 | 15 |
| Types of ink composition and solvent | Ink composition used for first image layer | 1-(2) | 1-(3) | 1-(3) | 1-(3) | 1-(1) | 1-(1) | 1-(2) | 1-(2) | 1-(2) |
| | Ink composition used for second image layer | 2-(3) | 2-(1) | 2-(2) | 2-(3) | 2-(1) | 2-(3) | 2-(1) | 2-(2) | 2-(3) |

TABLE 2-continued

| | | | | | | | | | | | |
|---|---|---|---|---|---|---|---|---|---|---|---|
| | | Ink composition used for third image layer | — | — | — | — | CL-1 | CL-1 | CL-1 | CL-1 | CL-1 |
| | | Presence of solvent by which resin of first image layer dissolves/ swells in second ink composition | Presence | Presence | Presence | Presence | Presence | Presence | Presence | Presence | Presence |
| | | Presence of solvent by which resin of first/second image layers dissolves/ swells in third ink composition | — | — | — | — | Presence/ Presence | Presence/ Presence | Presence/ Presence | Presence/ Presence | Presence/ Presence |
| First drying step | Air blowing | Air speed (m/s) | 0.5 | 0.5 | 0.5 | 0.5 | 0.5 | 0.5 | 0.5 | 0.5 | 0.5 |
| | | Surface temperature (° C.) | 40 | 40 | 40 | 40 | 40 | 40 | 40 | 40 | 40 |
| | Heat conduction | Rear surface platen (surface temperature: ° C.) | — | — | — | — | — | — | — | — | — |
| | Irradiation with radiation | Infrared radiation (surface temperature: ° C.) | 50 | 50 | 50 | 50 | 50 | 50 | 50 | 50 | 50 |
| Before forming second image layer | Evaporation rate (%) of water in first image layer | | 95 | 95 | 95 | 95 | 95 | 95 | 95 | 95 | 95 |
| | Evaporation rate (%) of organic solvent in first forming image layer | | 0 | 0 | 0 | 0 | 0 | 0 | 0 | 0 | 0 |
| | Evaporation rate (%) of volatile component in first image layer | | 55 95 | 62 95 | 62 95 | 62 95 | 65 95 | 65 95 | 55 95 | 55 95 | 55 95 |
| Second drying step | Air blowing | Air speed (m/s) | 20 | 20 | 20 | 20 | 20 | 20 | 20 | 20 | 20 |
| | | Surface temperature (° C.) | 90 | 90 | 90 | 90 | 90 | 90 | 90 | 90 | 90 |
| | Irradiation with radiation | Infrared radiation (surface temperature: ° C.) | 80 | 80 | 80 | 80 | 80 | 80 | 80 | 80 | 80 |
| Evaluation | Image quality | Bleeding | A | A | A | A | A | A | A | A | A |
| | Durability | Adhesion | A | A | A | A | A | A | A | A | A |

TABLE 2-continued

|  |  |  |  |  |  |  |  |  |  |
|---|---|---|---|---|---|---|---|---|---|
| (tape peeling) | | | | | | | | | |
| Abrasion resistance | B | B | B | B | A | A | A | A | A |

TABLE 3

| | | Examples | | | | | | |
|---|---|---|---|---|---|---|---|---|
| | | 16 | 17 | 18 | 19 | 20 | 21 | 22 |
| Types of ink composition and solvent | Ink composition used for first image layer | 1-(3) | 1-(3) | 1-(3) | 1-(1) | 1-(1) | 1-(2) | 1-(2) |
| | Ink composition used for second image layer | 2-(1) | 2-(2) | 2-(3) | 2-(1) | 2-(3) | 2-(1) | 2-(2) |
| | Ink composition used for third image layer | CL-1 | CL-1 | CL-1 | CL-2 | CL-2 | CL-2 | CL-2 |
| | Presence of solvent by which resin of first image layer dissolves/swells in second ink composition | Presence | Presence | Presence | Presence | Presence | Presence | Presence |
| | Presence of solvent by which resin of first/second image layers dissolves/swells in third ink composition | Presence/ Presence | Presence/ Presence | Presence/ Presence | Absence/ Absence | Absence/ Presence | Presence/ Absence | Presence/ Presence |
| First drying step | Air blowing — Air speed (m/s) | 0.5 | 0.5 | 0.5 | 0.5 | 0.5 | 0.5 | 0.5 |
| | Air blowing — Surface temperature (° C.) | 40 | 40 | 40 | 40 | 40 | 40 | 40 |
| | Heat conduction — Rear surface platen (surface temperature: ° C.) | — | — | — | — | — | — | — |
| | Irradiation with radiation — Infrared radiation (surface temperature: ° C.) | 50 | 50 | 50 | 50 | 50 | 50 | 50 |
| Before forming second image layer | Evaporation rate (%) of water in first image layer | 95 | 95 | 95 | 95 | 95 | 95 | 95 |
| | Evaporation rate (%) of organic solvent in first image layer | 0 | 0 | 0 | 0 | 0 | 0 | 0 |
| | Evaporation rate (%) of volatile component in first image layer | 62 | 62 | 62 | 65 | 65 | 55 | 55 |
| Second drying step | Air blowing — Air speed (m/s) | 20 | 20 | 20 | 20 | 20 | 20 | 20 |
| | Air blowing — Surface temperature (° C.) | 90 | 90 | 90 | 90 | 90 | 90 | 90 |
| | Irradiation with radiation — Infrared radiation (surface temperature: ° C.) | 80 | 80 | 80 | 80 | 80 | 80 | 80 |

TABLE 3-continued

| Evaluation | Image quality | Bleeding | A | A | A | A | A | A | A |
|---|---|---|---|---|---|---|---|---|---|
| | Durability | Adhesion (tape peeling) | B | B | B | B | A | B | A |
| | | Abrasion resistance | A | A | A | A | A | A | A |

| | | | Examples | | | | | | | |
|---|---|---|---|---|---|---|---|---|---|---|
| | | | 23 | 24 | 25 | 26 | 27 | 28 | 29 | 30 |
| Types of ink composition and solvent | Ink composition used for first image layer | | 1-(2) | 1-(3) | 1-(3) | 1-(3) | 1-(1) | 1-(1) | 1-(3) | 1-(3) |
| | Ink composition used for second image layer | | 2-(3) | 2-(1) | 2-(2) | 2-(3) | 2-(1) | 2-(3) | 2-(1) | 2-(2) |
| | Ink composition used for third image layer | | CL-2 | CL-2 | CL-2 | CL-2 | — | — | — | — |
| | Presence of solvent by which resin of first image layer dissolves/swells in second ink composition | | Presence | Presence | Presence | Presence | Presence | Presence | Presence | Presence |
| | Presence of solvent by which resin of first/second image layers dissolves/swells in third ink composition | | Absence/Presence | Presence/Absence | Presence/Presence | Presence/Presence | — | — | — | — |
| First drying step | Air blowing | Air speed (m/s) | 0.5 | 0.5 | 0.5 | 0.5 | 0.5 | 0.5 | 0.5 | 0.5 |
| | | Surface temperature (° C.) | 40 | 40 | 40 | 40 | 40 | 40 | 40 | 40 |
| | Heat conduction | Rear surface platen (surface temperature: ° C.) | — | — | — | — | — | — | — | — |
| | Irradiation with radiation | Infrared radiation (surface temperature: ° C.) | 50 | 50 | 50 | 50 | 50 | 50 | 50 | 50 |
| Before forming second image layer | Evaporation rate (%) of water in first image layer | | 95 | 95 | 95 | 95 | 100 | 100 | 100 | 100 |
| | Evaporation rate (%) of organic solvent in first image layer | | 0 | 0 | 0 | 0 | 94 | 94 | 94 | 94 |
| | Evaporation rate (%) of volatile component in first image layer | | 55 | 62 | 62 | 62 | 98 | 98 | 98 | 98 |
| Second drying step | Air blowing | Air speed (m/s) | 20 | 20 | 20 | 20 | 20 | 20 | 20 | 20 |
| | | Surface temperature (° C.) | 90 | 90 | 90 | 90 | 90 | 90 | 90 | 90 |
| | Irradiation with radiation | Infrared radiation (surface temperature: ° C.) | 80 | 80 | 80 | 80 | 80 | 80 | 80 | 80 |
| Evaluation | Image quality | Bleeding | A | A | A | A | A | A | A | A |

TABLE 3-continued

| | | | | | | | | | |
|---|---|---|---|---|---|---|---|---|---|
| Dura-bility | Adhesion (tape peeling) | A | B | B | B | A | A | B | B |
| | Abrasion resistance | A | A | A | A | A | A | B | B |

TABLE 4

| | | | Examples | | | | | |
|---|---|---|---|---|---|---|---|---|
| | | | 31 | 32 | 33 | 34 | 35 | 36 |
| Types of ink composition and solvent | Ink composition used for first image layer | | 1-(3) | 1-(1) | 1-(1) | 1-(2) | 1-(2) | 1-(2) |
| | Ink composition used for second image layer | | 2-(3) | 2-(1) | 2-(3) | 2-(1) | 2-(2) | 2-(3) |
| | Ink composition used for third image layer | | — | CL-1 | CL-1 | CL-1 | CL-1 | CL-1 |
| | Presence of solvent by which resin of first image layer dissolves/swells in second ink composition | | Presence | Presence | Presence | Presence | Presence | Presence |
| | Presence of solvent by which resin of first/second image layers dissolves/swells in third ink composition | | — | Presence/ Presence | Presence/ Presence | Presence/ Presence | Presence/ Presence | Presence/ Presence |
| First drying step | Air blowing | Air speed (m/s) | 0.5 | 0.5 | 0.5 | 0.5 | 0.5 | 0.5 |
| | | Surface temperature (° C.) | 40 | 40 | 40 | 40 | 40 | 40 |
| | Heat conduction | Rear surface platen (surface temperature: ° C.) | — | — | — | — | — | — |
| | Irradiation with radiation | Infrared radiation (surface temperature: ° C.) | 50 | 50 | 50 | 50 | 50 | 50 |
| Before forming second image layer | Evaporation rate (%) of water in first image layer | | 100 | 100 | 100 | 100 | 100 | 100 |
| | Evaporation rate (%) of organic solvent in first image layer | | 94 | 94 | 94 | 95 | 95 | 95 |
| | Evaporation rate (%) of volatile component in first image layer | | 98 | 98 | 98 | 98 | 98 | 98 |
| Second drying step | Air blowing | Air speed (m/s) | 20 | 20 | 20 | 20 | 20 | 20 |
| | | Surface temperature (° C.) | 90 | 90 | 90 | 90 | 90 | 90 |
| | Irradiation with radiation | Infrared radiation (surface temperature: ° C.) | 80 | 80 | 80 | 80 | 80 | 80 |
| Evaluation | Image quality | Bleeding | A | A | A | A | A | A |
| | Durability | Adhesion (tape peeling) | B | A | A | A | A | A |
| | | Abrasion resistance | B | A | A | A | A | A |

TABLE 5

| | | | Comparative Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Types of ink composition and solvent | Ink composition used for first image layer | | 1-(1) | 1-(1) | 1-(1) | 1-(1) | 1-(4) | 1-(4) | 1-(4) | 1-(4) | 1-(1) | 1-(5) | 1-(5) | 1-(1) |
| | Ink composition used for second image layer | | 2-(1) | 2-(1) | 2-(2) | 2-(2) | 2-(3) | 2-(3) | 2-(3) | 2-(3) | 2-(2) | 2-(3) | 2-(4) | 2-(2) |
| | Ink composition used for third image layer | | — | — | CL-3 | CL-3 | — | — | CL-3 | CL-3 | — | — | — | — |
| | Presence of solvent by which resin of first image layer dissolves/swells in second ink composition | | Presence | Presence | Absence | Absence | Presence | Presence | Presence | Presence | Absence | Presence | Presence | Absence |
| | Presence of solvent by which resin of first/second image layers dissolves/swells in third ink composition | | — | — | Absence/ Absence | Absence/ Absence | — | — | Presence/ Presence | Presence/ Presence | — | — | — | — |
| First drying step | Air blowing | Air speed (m/s) | 0 | 0.1 | 0.5 | 0.5 | 0.5 | 0.5 | 0.5 | 0.5 | 0.5 | 0.5 | 0.5 | 0.5 |
| | | Surface temperature (° C.) | 25 | 25 | 40 | 40 | 40 | 40 | 40 | 40 | 40 | 40 | 40 | 40 |
| | Heat conduction | Rear surface (surface platen temperature: ° C.) | — | — | — | — | — | — | — | — | — | — | — | — |

TABLE 5-continued

| | | | Comparative Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| | Irradiation with radiation | Infrared radiation (surface temperature: ° C.) | — | — | 50 | 50 | 50 | 50 | 50 | 50 | 50 | 50 | 50 | 50 |
| Before forming second image layer | Evaporation rate (%) of water in first image layer | | 30 | 70 | 95 | 100 | 95 | 100 | 95 | 100 | 100 | 95 | 95 | 30 |
| | Evaporation rate (%) of organic solvent in first image layer | | 0 | 0 | 0 | 94 | 33 | 95 | 33 | 95 | 94 | 0 | 0 | 0 |
| | Evaporation rate (%) of volatile component in first image layer | | 20 | 48 | 65 | 98 | 72 | 98 | 72 | 98 | 98 | 55 | 55 | 20 |
| Second drying step | Air blowing | Air speed (m/s) | 20 | 20 | 20 | 20 | 20 | 20 | 20 | 20 | 20 | 20 | 20 | 20 |
| | | Surface temperature (° C.) | 90 | 90 | 90 | 90 | 90 | 90 | 90 | 90 | 90 | 90 | 90 | 90 |
| | Irradiation with radiation | Infrared radiation (surface temperature: ° C.) | 80 | 80 | 80 | 80 | 80 | 80 | 80 | 80 | 80 | 80 | 80 | 80 |
| Evaluation | Image quality | Bleeding | D | C | A | A | A | A | A | A | A | A | A | D |
| | Durability | Adhesion (tape peeling) | A | A | C | D | D | D | D | D | D | D | D | C |
| | | Abrasion resistance | C | B | B | C | D | D | C | C | B | D | D | C |

7.3. Evaluation of Clogging

In the recording apparatus used for creating the recorded material, no cap was put on the head, and the head was left at the normal temperature and humidity for one or four day. After being left, 1 ml of ink was sucked and discharged from nozzle arrays having 360 nozzles (first cleaning). The number of times of cleaning needed for recovery of all nozzles from non-ejection and flight curvature was confirmed, and the result evaluated by the following criteria is described in Table 1.

A: No non-ejection and flight curvature found in all nozzles after third or less cleaning B: No non-ejection and flight curvature found in all nozzles after fourth to fifth cleaning C: No non-ejection and flight curvature found in all nozzles after sixth to ninth cleaning D: Non-ejection or flight curvature found in some nozzles even after tenth or more cleaning Referring to Table 1, in each ink composition, it was found that by the ink composition mixed such that the total content of the organic solvent by which resin particles contained in the corresponding ink do not dissolve or swell (with the SP value of more than ±1) is equal to or more than the total content of the organic solvent by which resin particles dissolve or swell (with the SP value within ±1), it is possible to suppress clogging even if water is evaporated in the vicinity of a nozzle of a recording head. In addition, it was found that clogging is likely to be generated by the ink compositions (1-(4), 2-(4), and CL-3) that do not satisfy this relationship.

7.4. Evaluation of Recorded Materials

The obtained recorded materials of each Example and Comparative Example were evaluated according to the following criteria. In addition, the results are shown in Tables 2 to 5.

7.4.1. Evaluation of Bleeding

Bleeding was evaluated as one type of image quality evaluation by visual observation from the recording surface side of the recorded material. The evaluation criteria are as follows.

A: There is no bleeding/color mixing between any of the ink layers

B: There is slight bleeding/color mixing between any of the ink layers

C: There is obvious bleeding/color mixing between any of the ink layers

D: There is remarkable bleeding/color mixing between any of the ink layers

7.4.2. Adhesion Evaluation

After the recorded material was left to stand in a laboratory in an environment of 20° C. to 25° C./40% RH to 60% RH for 5 hours, a transparent adhesive tape (trade name: Transparent beautiful color, manufactured by Sumitomo 3M Ltd.) was attached to the recording surface (image forming portion) of the recorded material. Then, by peeling the attached tape by hand and confirming the ink peeling on the recording surface and the state of ink transfer to the tape, the adhesion (durability) was evaluated based on the tape releasability (peeling resistance). The evaluation criteria for adhesion are as follows.

A: There is no image peeling and no ink attachment to the tape

B: There is no image peeling and slight ink attachment to the tape

C: Image peeling and ink attachment to the tape are observed

D: The image is entirely peeled off

7.4.3. Abrasion Resistance Evaluation

After the recorded material was left to stand in a laboratory in an environment of 20° C. to 25° C./40% RH to 60% RH for 5 hours, by confirming the ink peeling state of the recording surface or the ink transfer state to the cloth when the recording surface (image forming portion) of the recorded material was rubbed 20 times with a cloth under a load of 200 g using a color fastness rubbing tester AB-301 (trade name, manufactured by Tester Sangyo Co., Ltd.), the abrasion resistance (durability) was evaluated. The evaluation criteria for the abrasion resistance are as follows.

- A: There are no rubbing traces on the image and no ink attachment to the cloth
- B: There are rubbing traces on the image and slight ink attachment to the cloth
- C: Rubbing traces on the image and ink attachment to the cloth are observed
- D: The image is peeled and the ink attachment to the cloth is remarkable

7.5. Evaluation Results

The above evaluation results are shown in Tables 2 to 5.

As shown in the result, in the examples where the evaporation rate of water in the first ink composition is high (80% by mass or more), it was possible to sufficiently suppress bleeding of an image. In addition, in the examples where the organic solvent by which the resin particles contained in the first image layer that becomes the undercoat layer for the second ink composition dissolve or swell was mixed, the durability (adhesion and abrasion resistance) was good for all examples.

Referring to Comparative Examples 5 to 8, since glycerin of more than 2% by mass was contained in the first ink composition, the adhesion was poor. It is considered that the reason is that the organic solvent by which resin particles dissolve volatilizes first. In addition, in these examples, it is considered that the abrasion resistance is poor because the solvent having a high boiling point (glycerin) remains in the recorded material.

Furthermore, in Examples 27 to 36, the evaporation rate of water after the first drying step is relatively high; however, there was a tendency that the adhesion was deteriorated in some cases comparing to Examples 3 to 26 in which the same evaporation rate of water is 95% by mass. It is considered that the reason is that if the evaporation rate of water is higher, filming of resin particles of the first image layer further proceeds and dissolving the resin particles again by the organic solvent (by which the resin particles dissolve or swell) of the second ink composition becomes difficult. Therefore, the evaporation rate of water is 80% by mass or more, and it is possible to predict that if the evaporation rate gets closer to 80%, the result regarding the adhesion becomes more favorable.

Conversely, from these results, a case where after completing the first drying step by printing the first image layer, the second drying step is completed before printing the second image layer, and then most of the volatile components in the image layer are evaporated (Examples 27 to 36), that is, a case where filming of resin particles proceeds has a tendency that the results become more favorable regarding the abrasion resistance in some cases. Furthermore, this is also favorable regarding the image quality.

Furthermore, in Examples 32 to 36 among Examples 27 to 36, the image quality and the abrasion resistance are excellent comparing to Examples 11 to 15 in which the evaporation rate of water is lower than the corresponding examples (and the evaporation rate of the volatile components including an organic solvent or the like is also lower); however, in the light of the evaluation criteria described above, the results are all "A", and there is a possibility that superiority or inferiority was not fully expressed with the evaluation method described above.

As above, in a case where the adhesion is considered to be important, it is favorable that the evaporation rate of water in the first drying step is lower (however it is necessary that the rate is 80% by mass or more). On the other hand, in a case where the image quality and the abrasion resistance are considered to be important, it is favorable that the evaporation rate of water in the first drying step is higher and that after completing the second drying step before printing the image layer of the upper layer, most of the volatile components also including an organic solvent or the like are evaporated, and then the image layer of the upper layer is printed. It is understood that the evaporation rate in the first drying step is to be adjusted depending on the cases and the second drying step is to be completed if necessary.

On the other hand, in the examples where the evaporation rate of water is low as in Comparative Examples 1, 2, and 12, the bleeding of an image is poor.

Furthermore, in examples using the clear ink composition, the abrasion resistance was improved while the adhesion of an image hardly deteriorates in all examples. That is, in these examples, it is considered that the film thickness becomes thicker which leads to the large interlayer distortion; however, it was found that in spite of this, the abrasion resistance was improved while the adhesion hardly deteriorates.

Furthermore, when comparing the types of a resin in resin particles, a urethane-based resin and a polyester-based resin are more favorable in the adhesion compared to a styrene-acrylic-based resin.

The invention is not limited to the embodiment described above, and various modifications are possible. For example, the invention includes configurations substantially the same as described in the embodiments (for example, configurations having the same function, method, and results, or configurations having the same object and effects). In addition, the invention includes configurations in which non-essential portions of the configurations described in the embodiments are replaced. In addition, the invention includes configurations which achieve the same operation and effects as the configuration described in the embodiments, or configurations which achieve the same object. In addition, the invention includes configurations in which a well-known technique is added to the configuration described in the embodiments.

The entire disclosure of Japanese Patent Application No. 2016-147373, filed Jul. 27, 2016 is expressly incorporated by reference herein.

What is claimed is:

1. An ink jet recording method comprising:
   forming a first image layer by ejecting a first ink composition that contains resin particles, an organic solvent, and water on a recording medium by an ink jet method;
   first drying in which 80% by mass or more of water contained in the first ink composition of the first image layer is evaporated; and
   forming a second image layer by ejecting a second ink composition that contains water, and an organic solvent by which the resin particles contained in the first ink composition dissolve or swell on the first image layer subjected to the first drying by the ink jet method,
   wherein the content of an organic solvent having a normal boiling point of higher than 250° C. in the first ink composition and the second ink composition is 2% by mass or less, respectively.

2. The ink jet recording method according to claim 1,
wherein each of the first ink composition and the second ink composition contains an organic solvent having a normal boiling point of 100° C. or higher and 250° C. or lower.

3. The ink jet recording method according to claim 1,
wherein an SP value of an organic solvent by which the resin particles contained in the first ink composition dissolve or swell is within the range of ±1 (unit: $(cal/cm^3)^{1/2}$) with respect to an SP value of the resin particles contained in the first ink composition.

4. The ink jet recording method according to claim 1,
wherein the recording medium is a low ink absorption or a non-ink absorption recording medium.

5. The ink jet recording method according to claim 1,
wherein each of the first ink composition and the second ink composition contains a coloring material.

6. The ink jet recording method according to claim 5,
wherein the first ink composition is a background image ink composition that contains at least one of metal compound particles and metal particles as a coloring material, and
the second ink composition is a colored ink composition that contains a non-white coloring material.

7. The ink jet recording method according to claim 1, further comprising:
forming a third image layer by ejecting a clear ink composition that contains resin particles, an organic solvent, and water on the first image layer or the second image layer by the ink jet method after forming the second image layer.

8. The ink jet recording method according to claim 1, further comprising:
second drying in which a volatile component on the recording medium is evaporated after forming each image layer.

9. The ink jet recording method according to claim 1,
wherein in the first drying, the evaporation rate of the organic solvent contained in the first ink composition of the first image layer is 50% by mass or less.

10. The ink jet recording method of claim 1 wherein a surface temperature of the recording medium of the first drying is 40° C. or less.

11. The ink jet recording method of claim 1 wherein the evaporation rate of the organic solvent contained in the first ink composition of the first image layer is 5% by mass or less.

12. The ink jet recording method of claim 1 wherein the evaporation rate of the organic solvent contained in the first ink composition of the first image layer is 3% by mass or less.

* * * * *